(12) United States Patent
Workman et al.

(10) Patent No.: US 12,372,268 B1
(45) Date of Patent: Jul. 29, 2025

(54) EXHAUST PLENUM SYSTEM AND METHODS FOR A VENTILATION SYSTEM

(71) Applicants: Brian R. Workman, Watertown, MA (US); Tyler J. Olson, Watertown, MA (US)

(72) Inventors: Brian R. Workman, Watertown, MA (US); Tyler J. Olson, Watertown, MA (US)

( * ) Notice: Subject to any disclaimer, the term of this patent is extended or adjusted under 35 U.S.C. 154(b) by 0 days.

(21) Appl. No.: 18/762,157

(22) Filed: Jul. 2, 2024

Related U.S. Application Data

(60) Provisional application No. 63/660,233, filed on Jun. 14, 2024.

(51) Int. Cl.
*F24F 12/00* (2006.01)
*F24F 7/00* (2021.01)

(52) U.S. Cl.
CPC ...... *F24F 12/003* (2013.01); *F24F 2007/001* (2013.01)

(58) Field of Classification Search
None
See application file for complete search history.

(56) References Cited

U.S. PATENT DOCUMENTS

| | | | |
|---|---|---|---|
| 10,948,202 B2 * | 3/2021 | Lee | F24F 3/153 |
| 2002/0017107 A1 * | 2/2002 | Bailey | F24F 3/14 |
| | | | 62/93 |
| 2021/0108805 A1 * | 4/2021 | Imaizumi | F24F 13/20 |
| 2022/0390126 A1 * | 12/2022 | Kazimirovich | F24F 12/003 |

FOREIGN PATENT DOCUMENTS

| | | | | |
|---|---|---|---|---|
| CN | 113175723 A | * | 7/2021 | E06B 5/205 |
| FR | 2941521 A1 | * | 7/2010 | F24D 17/001 |
| FR | 3071910 B1 | * | 11/2019 | F24F 13/04 |
| JP | 2004353274 A | * | 12/2004 | |

OTHER PUBLICATIONS

CN-113175723-A English Machine Translation (Year: 2021).*
FR-2941521-A1 English Machine Translation (Year: 2010).*
FR-3071910-B1 English Machine Translation (Year: 2019).*
JP-2004353274-A English machine translation (Year: 2004).*

* cited by examiner

*Primary Examiner* — Jenna M Maroney
(74) *Attorney, Agent, or Firm* — Goodwin Procter LLP

(57) ABSTRACT

Described herein is a ventilation system for a building that includes an air source heat pump and an exhaust plenum system. The air source heat pump may include a compressor, a condenser, a reversing valve, and an evaporator. The exhaust plenum system is configured to mix building infrastructure exhaust airflow with an ambient airflow to provide an exhaust-ambient airflow mixture to the air source heat pump. The use of the exhaust-ambient airflow mixture improves the efficiency of the air source heat pump.

19 Claims, 32 Drawing Sheets

| TYPICAL HEATING OPERATION | | | |
|---|---|---|---|
| | PRESSURE (PSIA) | TEMP (DEG F) | ENTHALPY (BTU/lb) |
| A | 45 | -16 | 64.2 |
| B | 45 | -16 | 117.3 |
| C | 45 | -10 | 118.9 |
| D | 500 | 131 | 194 |
| E | 500 | 131 | 121 |
| F | 500 | 131 | 67.4 |
| G | 500 | 125 | 64.2 |

| Ambient | STANDARD | | EXHAUST PLENUM SYSTEM | |
|---|---|---|---|---|
| | MBH | COP | MBH | COP |
| 0 | 193.00 | 1.96 | 208.84 | 2.07 |
| 10 | 219.80 | 2.14 | 234.90 | 2.22 |
| 20 | 251.40 | 2.37 | 265.40 | 2.47 |
| 30 | 287.60 | 2.65 | 298.94 | 2.71 |

| OAT | MAT |
|---|---|
| 0.00 | 6.00 |
| 10.00 | 15.17 |
| 20.00 | 24.33 |
| 30.00 | 33.50 |
| 40.00 | 42.67 |
| 50.00 | 51.83 |
| 60.00 | 61.00 |
| 70.00 | 70.17 |
| 80.00 | 79.33 |
| 90.00 | 88.50 |
| 100.00 | 97.67 |

FIG. 9

| Ambient | STANDARD | | EXHAUST PLENUM SYSTEM | |
|---|---|---|---|---|
| | MBH | COP | MBH | COP |
| 80 | 27.98 | 3.59 | 26.85 | 3.73 |
| 85 | 27.16 | 3.35 | 27.86 | 3.49 |
| 90 | 26.32 | 3.12 | 28.73 | 3.30 |
| 95 | 25.47 | 2.90 | 29.88 | 3.08 |

FIG. 10B

| COLUMN 1 | COLUMN 2 | COLUMN 3 | | | | | |
|---|---|---|---|---|---|---|---|
| # Modules | Total Airflow CFM | Lab Airflow CFM | Ambient Temp F | Exhaust Air Temp F | Mixed Air Temp F | Single Module Capacity MBH | TOTAL CAPACITY MBH |
| 6 | 144000 | 50000 | 0 | 70 | 24.3 | 265.4 | 1592.4 |
| 7 | 168000 | 50000 | 0 | 70 | 20.8 | 251.4 | 1759.8 |
| 8 | 192000 | 50000 | 0 | 70 | 18.2 | 244.8 | 1958.4 |
| 9 | 216000 | 50000 | 0 | 70 | 16.2 | 238.2 | 2143.8 |
| 10 | 240000 | 50000 | 0 | 70 | 14.6 | 231.88 | 2318.8 |
| 11 | 264000 | 50000 | 0 | 70 | 13.3 | 228.86 | 2517.46 |
| 12 | 288000 | 50000 | 0 | 70 | 12.2 | 225.84 | 2710.08 |
| 13 | 312000 | 50000 | 0 | 70 | 11.2 | 222.82 | 2896.66 |
| 14 | 336000 | 50000 | 0 | 70 | 10.4 | 219.8 | 3077.2 |
| 15 | 360000 | 50000 | 0 | 70 | 9.7 | 217.06 | 3255.9 |
| 16 | 384000 | 50000 | 0 | 70 | 9.1 | 217.06 | 3472.96 |

| # Modules | Total Airflow CFM | Lab Airflow CFM | Ambient Temp F | Exhaust Air Temp F | Mixed Air Temp F | Single Module Capacity TONS | TOTAL CAPACITY TONS |
|---|---|---|---|---|---|---|---|
| 6 | 144000 | 50000 | 95 | 72 | 87.0 | 26.824 | 160.944 |
| 7 | 168000 | 50000 | 95 | 72 | 88.2 | 26.656 | 186.592 |
| 8 | 192000 | 50000 | 95 | 72 | 89.0 | 26.488 | 211.904 |
| 9 | 216000 | 50000 | 95 | 72 | 89.7 | 26.488 | 238.392 |
| 10 | 240000 | 50000 | 95 | 72 | 90.2 | 26.32 | 263.2 |
| 11 | 264000 | 50000 | 95 | 72 | 90.6 | 26.32 | 289.52 |
| 12 | 288000 | 50000 | 95 | 72 | 91.0 | 26.15 | 313.8 |
| 13 | 312000 | 50000 | 95 | 72 | 91.3 | 26.15 | 339.95 |
| 14 | 336000 | 50000 | 95 | 72 | 91.6 | 26.15 | 366.1 |
| 15 | 360000 | 50000 | 95 | 72 | 91.8 | 26.15 | 392.25 |
| 16 | 384000 | 50000 | 95 | 72 | 92.0 | 25.98 | 415.68 |

1106

|  | BASELINE | EXH PL SYS | EFFICIENCY IMPROVEMENT |
|---|---|---|---|
| HEAT KWH | 220,915 | 174,109 | 21.2% |
| COOL KWH | 223,636 | 215,001 | 3.9% |
| TOTAL KWH | 444,551 | 389,110 | 12.5% |

| KWH DEMAND COMPARISON | | | |
|---|---|---|---|
| | BASELINE | EXH PL SYS | % IMPROVEMENT |
| JANUARY | 446 | 409 | 8.1% |
| FEBRUARY | 335 | 296 | 11.7% |
| MARCH | 208 | 177 | 14.7% |
| APRIL | 229 | 214 | 6.7% |
| MAY | 260 | 247 | 4.8% |
| JUNE | 340 | 330 | 2.8% |
| JULY | 386 | 373 | 3.6% |
| AUGUST | 378 | 368 | 2.8% |
| SEPTEMBER | 210 | 203 | 3.2% |
| OCTOBER | 194 | 189 | 2.5% |
| NOVEMBER | 244 | 209 | 14.4% |
| DECEMBER | 264 | 226 | 14.5% |

FIG. 12C

| # MODULES REQUIRED | |
|---|---|
| BASELINE | 16.0 |
| EXHAUST PLENUM SYS. | 14.0 |

| | STANDARD | |
|---|---|---|
| | HEAT KWH | COOL KWH |
| JANUARY | 37,674.09 | - |
| FEBRUARY | 23,813.92 | - |
| MARCH | 15,650.79 | 912.05 |
| APRIL | 6,564.28 | 2,045.80 |
| MAY | 2,960.15 | 9,673.57 |
| JUNE | 1,532.91 | 22,512.13 |
| JULY | 548.94 | 43,301.17 |
| AUGUST | 922.39 | 35,014.31 |
| SEPTEMBER | 1,934.48 | 15,381.55 |
| OCTOBER | 4,363.82 | 3,612.30 |
| NOVEMBER | 12,276.48 | 153.24 |
| DECEMBER | 21,791.18 | - |
| TOTAL | 130,033.43 | 132,606.12 |

FIG. 13B

| EXHAUST AIR PLENUM SYSTEM | | |
|---|---|---|
| | HEAT KWH | COOL KWH |
| JANUARY | 33,511.16 | - |
| FEBRUARY | 20,880.14 | - |
| MARCH | 13,408.24 | 916.72 |
| APRIL | 5,539.72 | 1,975.72 |
| MAY | 2,659.59 | 9,643.71 |
| JUNE | 1,429.06 | 22,248.15 |
| JULY | 537.92 | 42,585.16 |
| AUGUST | 898.80 | 34,659.84 |
| SEPTEMBER | 1,827.76 | 15,379.65 |
| OCTOBER | 3,778.67 | 3,615.70 |
| NOVEMBER | 10,619.20 | 157.15 |
| DECEMBER | 18,995.97 | - |
| TOTAL | 114,086.22 | 131,181.81 |

FIG. 13C

|  | BASELINE | EXH PL SYS | EFFICIENCY IMPROVEMENT |
|---|---|---|---|
| HEAT KWH | 130,033 | 114,086 | 12.3% |
| COOL KWH | 132,606 | 131,182 | 1.1% |
| TOTAL KWH | 262,640 | 245,268 | 6.6% |

FIG. 13D

EXHAUST PLENUM SYSTEM AND METHODS FOR A VENTILATION SYSTEM

CROSS-REFERENCE TO RELATED APPLICATION

This application claims priority to U.S. Provisional Patent Application No. 63/660,233, filed on Jun. 14, 2024, the entire contents of which are hereby incorporated by reference.

BACKGROUND

As electrification and carbon neutral initiatives promote the use of clean energy (e.g., electricity generated by the sun, wind, water, and so forth) for heating and cooling needs as an alternative to the use of fossil fuels, the need for energy efficiency solutions have risen for systems that are currently implemented and will be implemented going forward. Thermodynamic heating and cooling systems are utilized to condition clean, comfortable air, for both commercial and residential buildings, and the current process has been understood for quite some time.

For example, referring to FIG. 1 and FIG. 16 (a pressure-enthalpy refrigeration cycle of a conventional thermodynamic cooling system at 95° F. ambient airflow temperature), a conventional thermodynamic cooling (e.g., air-conditioning or refrigeration) system and its associated pressure-enthalpy (PH) refrigeration cycle, respectively, are shown. In some embodiments, the conventional thermodynamic cooling ventilation system 100 comprises a compressing unit 102, a condensing unit 104, an evaporating unit 106, and a metering device 108 (e.g., an expansion valve) that are in fluid communication for the purpose of circulating a fluid (e.g., refrigerant) that removes heat from the operating environment. When the heat pump functions as a conventional thermodynamic cooling ventilation system 100, the reversing valve 110 disposed between the compressing unit 102 and the condensing unit 104 and between the compressing unit 102 and the evaporating unit 106 is configured so that fluid exiting a compressor outlet 112 of the compressing unit 102 is channeled (e.g., via the reversing valve 110) to the condensing unit 104 and fluid exiting the evaporating unit 106 is channeled (e.g., via the reversing valve 110) to the compressor inlet 114 of the compressing unit 102. More specifically, when the (e.g., refrigerant) fluid is in a liquid state, the (e.g., refrigerant) fluid absorbs heat, transitioning from the liquid state to a gaseous or vapor state. When the (e.g., refrigerant) fluid is in a gas/vapor state, the (e.g., refrigerant) fluid gives off heat as it transitions from the gaseous state to the liquid state.

For a cooling operation, the (e.g., refrigerant) fluid enters the compressing unit 102 (e.g., via a compressor inlet 114) as a low-pressure, saturated gas/vapor (Point C). The compressing unit 102 compresses the low-pressure, saturated gas/vapor, such that, upon exiting the compressing unit (e.g., via the compressor outlet 112), the (e.g., refrigerant) fluid comprises a high-pressure, saturated gas/vapor (Point D). The high-pressure, saturated gas/vapor travels through the reversing valve 110, entering the condensing unit 104 (Point E).

In the condensing unit 104, the high-pressure, saturated gas/vapor condenses, transitioning from a high-pressure, saturated gas/vapor to a high-pressure mixture having a liquid portion and a gas/vapor portion to a saturated, high-pressure liquid. The condensation process (Point E to Point F) gives off heat to the (e.g., the exterior or outdoor) environment 116. The saturated, high pressure, condensed liquid exiting the condensing unit 104 (Point F) then travels to the metering device 108 (e.g., expansion valve) (Point G).

The metering device 108 (e.g., expansion valve) restricts the flow of the fluid, lowering the pressure, transitioning the saturated, high pressure, condensed liquid into a low-pressure mixture having a liquid portion and a gas/vapor portion (Point A). The low-pressure mixture having a liquid portion and a gas/vapor portion enters the evaporating unit 106 (Point A). The evaporating unit 106 (Point A) causes the low-pressure mixture having a liquid portion and a gas/vapor portion to transition into a low-pressure saturated gas/vapor (Point B). The transition (Point A to Point B) absorbs heat from the (e.g., interior, or indoor) environment 118. The heated, low-pressure saturated gas/vapor travels to the compressor inlet 114 (Point C) of the compressing unit 102 and the cooling cycle is repeated.

Pressure, temperature, and enthalpy values for a typical cooling cycle are shown in TABLE I. More specifically, referring to TABLE I and FIG. B, between Points A and B, a low-temperature, low-pressure fluid (e.g., a mixture of liquid and gas/vapor) from the metering device 108 enters the evaporating unit 106, causing an increase in enthalpy, which cools the (e.g., interior, or indoor) environment 118. Between Points B and C, the low-temperature, low-pressure fluid (e.g., gas/vapor) becomes a saturated gas/vapor as it travels to the compressing unit 102, causing slight increases to the temperature and enthalpy.

TABLE I

CONVENTIONAL THERMODYNAMIC COOLING OPERATION PERFORMANCE

|   | PRESSURE (PSIA) | TEMP (DEG F.) | ENTHALPY (BTU/lb) |
|---|---|---|---|
| A | 120 | 34 | 52.4 |
| B | 120 | 34 | 121.2 |
| C | 120 | 40 | 122.8 |
| D | 600 | 114 | 144 |
| E | 600 | 114 | 122.5 |
| F | 600 | 114 | 58.8 |
| G | 600 | 600 | 52.4 |

Between Points C and D, the low-temperature, low-pressure fluid (e.g., saturated gas/vapor) enters the compressing unit 102, where the fluid is compressed to provide a high-temperature, high-pressure fluid (e.g., saturated gas/vapor). Between Points D and E, the high-temperature, high-pressure fluid (e.g., saturated gas/vapor) travels to the condensing unit 104, causing a slight decrease in enthalpy. Between Points E and F, the high-temperature, high-pressure fluid (e.g., saturated gas/vapor) transitions into a high-temperature, high-pressure fluid (e.g., saturated liquid), resulting in a more significant decrease in enthalpy. Heat from the condensing unit 104 is exchanged into the (e.g., exterior, or outdoor) environment 116.

Between Points F and G, the temperature and enthalpy of the high-temperature, high-pressure fluid (e.g., saturated liquid) decreases slightly as the saturated liquid enters the metering device (e.g., expansion valve) 40. Between Points G and A, the high-temperature, high-pressure fluid (e.g., saturated liquid) transitions to a low-temperature, low-pressure fluid (e.g., liquid and gas/vapor mixture) that has approximately the same enthalpy. The cycle repeats at this point.

Referring to FIG. 2 and FIG. 17 (a pressure-enthalpy refrigeration cycle of a conventional thermodynamic heating ventilation system at 0° F. ambient airflow temperature), a conventional thermodynamic heating ventilation system and its associated pressure-enthalpy (PH) refrigeration cycle, respectively, are shown. In some embodiments, the conventional thermodynamic heating ventilation system 200 also comprises a compressing unit 102, a condensing unit 104, an evaporating unit 106, and a metering device 108 (e.g., an expansion valve) that are in fluid communication for the purpose of circulating a (e.g., refrigerant) fluid that adds heat into the operating environment. Advantageously, when the heat pump functions as a conventional thermodynamic heating ventilation system 200, the reversing valve 110 disposed between the compressing unit 102 and the condensing unit 104 and between the compressing unit 102 and the evaporating unit 106 is configured so that fluid exiting the compressor outlet 112 of the compressing unit 102 is channeled (e.g., via the reversing valve 110) to the condensing unit 104 and fluid exiting the evaporating unit 106 is channeled (e.g., via the reversing valve 110) to the compressor inlet 114 of the compressing unit 102.

For a heating operation, the (e.g., refrigerant) fluid enters the compressing unit 102 (e.g., via a compressor inlet 114) as a low-pressure, low-temperature saturated gas/vapor. The compressing unit 102 compresses the (e.g., refrigerant) fluid, causing the fluid to transition from a low-pressure, low-temperature saturated gas/vapor into a high-pressure, high-temperature (e.g., superheated) saturated gas/vapor. Condensation of the (e.g., refrigerant) fluid gives off heat to the interior or indoor environment 118. More specifically, the entering (e.g., refrigerant) fluid transitions from a high-pressure, high-temperature, saturated gas/vapor into to a saturated liquid.

The (e.g., refrigerant) fluid then travels to the metering device 108 (e.g., expansion valve). The metering device 108 restricts the flow of the (e.g., refrigerant) fluid, lowering the pressure and temperature. The low-temperature, low-pressure fluid (e.g., saturated liquid) then enters the evaporating unit 106, where it absorbs heat from the (e.g., exterior, or outdoor) environment 116, changing the fluid from a low-temperature, low-pressure liquid to a low-temperature, low-pressure gas/vapor. The (e.g., refrigerant) fluid then travels to the compressor inlet 114 of the compressing unit 102 and the heating cycle is repeated.

Pressure, temperature, and enthalpy values for a typical heating cycle are shown in TABLE II. More specifically, referring to TABLE II and FIG. 17, between Points A and B, a low-temperature, low-pressure fluid (e.g., a mixture of liquid and gas/vapor) from the metering device 108 (at Point G) enters the evaporating unit 106, causing an increase in enthalpy, which draws heat from the (e.g., exterior, or outdoor) environment 116. Between Points B and C, the low-temperature, low-pressure mixture of liquid and gas/vapor becomes a low-temperature, low-pressure saturated gas/vapor as it travels through the reversing valve 110 to the compressing unit 102, causing slight increases to the temperature and enthalpy.

TABLE II

CONVENTIONAL THERMODYNAMIC
HEATING OPERATION PERFORMANCE

| | PRESSURE (PSIA) | TEMP (DEG F.) | ENTHALPY (BTU/lb) |
|---|---|---|---|
| A | 40 | −21 | 64.2 |
| B | 40 | −21 | 116.5 |
| C | 40 | −15 | 117.8 |

TABLE II-continued

CONVENTIONAL THERMODYNAMIC
HEATING OPERATION PERFORMANCE

| | PRESSURE (PSIA) | TEMP (DEG F.) | ENTHALPY (BTU/lb) |
|---|---|---|---|
| D | 500 | 131 | 194 |
| E | 500 | 131 | 121 |
| F | 500 | 131 | 67.4 |
| G | 500 | 125 | 64.2 |

Between Points C and D, the low-temperature, low-pressure fluid (e.g., saturated gas/vapor) enters the compressing unit 102, where the fluid is compressed to provide a high-temperature, high-pressure (e.g., superheated) fluid (e.g., saturated gas/vapor). Between Points D and E, the high-temperature, high-pressure fluid (e.g., saturated gas/vapor) travels via the reversing valve 110 to the condensing unit 104, causing a slight decrease in enthalpy. Between Points E and F, the high-temperature, high-pressure fluid (e.g., saturated gas/vapor) transitions to a high-temperature, high-pressure fluid (e.g., saturated liquid), resulting in a more significant decrease in enthalpy. Heat from the condensing unit 10 is exchanged into the (e.g., interior, or indoor) environment 118.

Between Points F and G, the temperature and enthalpy of the high-temperature, high-pressure fluid (e.g., saturated liquid) decreases slightly as the saturated liquid enters the metering device 108 (e.g., expansion valve). Between Points G and A, the high-temperature, high-pressure fluid (e.g., saturated liquid) transitions to a low-temperature, low-pressure fluid (e.g., mixture of liquid and gas/vapor) that has approximately the same enthalpy. The cycle repeats at this point.

Problematically, during the heating operation, there is a larger pressure and temperature change (i.e., delta) between the high side of the refrigeration cycle and the low side of the refrigeration cycle. Indeed, the suction temperature proximate the compressor inlet 114 of the compressing unit 102 becomes more of a limiting factor as the ambient temperature in the (e.g., exterior, or outdoor) environment 116 decreases further (e.g., to sub-zero temperatures), affecting the ability of the conventional thermodynamic heating ventilation system 200 to operate effectively.

TABLE III

CONVENTIONAL THERMODYANMIC
HEATING SYSTEM CONDENSER
CAPACITY AND EFFICIENCY

| Condenser Capacity | 186100 | BTUH |
|---|---|---|
| Efficiency | 1.78 | COP |

Referring to TABLE III, which illustrates an example at 0 degrees ambient for heating mode, the conventional thermodynamic heating ventilation system condenser capacity is 186,100 BTUH and the coefficient of performance (COP) efficiency is 1.78. COP is a dimensionless value that measures the electrical efficiency of heating and cooling systems.

In current thermodynamic cooling systems, when the high-pressure, saturated gas/vapor condenses in the condensing unit 104 (Point E to Point F), the process gives off heat to the (e.g., the exterior or outdoor) environment 116. In current thermodynamic heating systems, when the low-pressure, low-temperature liquid evaporates in the evaporating unit 106, the process absorbs heat (thereby giving off cooling) from the (e.g., the exterior or outdoor) environment 116.

This heat/cooling exhaust that is a by-product of the thermodynamic process has yet to be harnessed, and the carbon footprint of a system that utilizes this exhaust is reduced, costs are decreased, and system efficiency increased. Additionally, exhaust from other building infrastructure systems may also be utilized to further increase efficiency and electrical performance of building ventilation systems.

SUMMARY

In one aspect, a ventilation system having an exhaust plenum system for improved heating and cooling a building is provided. The ventilation system includes an air source heat pump (ASHP), and an exhaust plenum system. The ASHP includes an ASHP coil and a source/sink fan. The exhaust plenum system includes an exhaust plenum system open grating, where the exhaust plenum system is configured to collect a building infrastructure exhaust airflow and direct the building infrastructure exhaust airflow to the exhaust plenum system open grating. In operation, the building infrastructure exhaust airflow combines with ambient airflow to create an exhaust-ambient airflow mixture. The exhaust-ambient airflow mixture is directed via the source/sink fan to pass around the ASHP coil, and the ASHP is operable to extract an additional amount of energy from the exhaust-ambient airflow mixture as compared to an amount of energy extracted from an ambient airflow mixture alone.

In another aspect, a method for improved heating and cooling of a building using an exhaust plenum system is provided. The method includes directing an exhaust stream including building infrastructure exhaust airflow in an exhaust plenum system toward an air source heat pump (ASHP). The exhaust plenum system includes an exhaust plenum system open grating, and may be positioned adjacent to the ASHP. In operation, mixing the exhaust stream may be mixed with ambient airflow that enters the exhaust plenum system via the exhaust plenum system open grating to create an exhaust-ambient airflow mixture. The exhaust-ambient airflow mixture may pass around an ASHP coil of the ASHP. The ASHP extracts an additional amount of energy from the exhaust-ambient airflow mixture as compared to an amount of energy extracted from an ambient airflow mixture alone.

In a further aspect, a ventilation system for a building includes an air source heat pump including a compressor, a condenser, a reversing valve, and an evaporator, and an exhaust plenum system configured to mix building infrastructure exhaust airflow with an ambient airflow to provide an exhaust-ambient airflow mixture to the either the evaporator or the condenser of the air source heat pump. The exhaust-ambient airflow mixture contains an additional amount of energy to be extracted by the evaporator or the condenser from the exhaust-ambient airflow mixture as compared to an amount of energy extracted from an ambient airflow mixture alone to thereby improve efficiency of the air source heat pump.

In yet another aspect, a method for ventilating a building is provided. The method includes entering airflow into an air source heat pump via source/sink fans, passing the airflow over an evaporator or a condenser with the source/sink fans, gathering energy from the airflow evaporating or condensing, converting the airflow into building infrastructure exhaust airflow, rejecting the building infrastructure exhaust airflow from the evaporator or the condenser, entering the building infrastructure exhaust airflow into an exhaust plenum, passing the building infrastructure exhaust airflow through the exhaust plenum, exiting the building infrastructure exhaust airflow from the exhaust plenum, mixing the building infrastructure exhaust airflow with ambient airflow, thereby creating an exhaust-ambient airflow mixture, and directing the exhaust-ambient airflow mixture over the evaporator or the condenser to restart the cycle of converting the airflow into building infrastructure exhaust airflow.

BRIEF DESCRIPTION OF THE DRAWINGS

FIG. 8B illustrates a table of the exemplary performance values of an exemplary thermodynamic heating ventilation system equipped with an exhaust plenum system having a pressure-enthalpy refrigeration cycle as shown in the exemplary chart of FIG. 8A.

FIG. 8D illustrates a table displaying the heating capacity of a standard air source heat pump and an air source heat pump with exhaust plenum system having a pressure-enthalpy refrigeration cycle as shown in the exemplary chart of FIG. 8A.

FIG. 9 illustrates a table displaying exhaust-ambient airflow mixture temperature in accordance with an embodiment of the disclosed subject matter.

FIG. 10B illustrates a table displaying an exemplary comparison of cooling capacity of a standard air source heat pump to an exemplary air source heat pump with exhaust plenum system of FIG. 10A.

FIG. 11B illustrates a table depicting exemplary heating capacity of an exemplary air source heat pump with exhaust plenum system provided by a number of different ventilation system modules.

FIG. 12B illustrates a table displaying the heating output, cooling output, total output of a standard air source heat pump and an exemplary air source heat pump with exhaust plenum system for the 50,000 CFM laboratory example of FIG. 12A.

FIG. 12C illustrates a table displaying the monthly maximum output of a standard air source heat pump and an exemplary air source heat pump with exhaust plenum system for a 50,000 CFM laboratory example of FIG. 12A.

FIG. 12D illustrates a table displaying the number of air source heat pump modules required for a standard air source heat pump and an air source heat pump with exhaust plenum system in relation to the information presented in the examples of FIG. 12A through FIG. 12C.

FIG. 13B illustrates a table of values of a standard air source heat pump heating and cooling output for a high rise residential building.

FIG. 13C illustrates a table of an air source heat pump with exhaust plenum system heating and cooling output for a high rise residential building of FIG. 13B in accordance with embodiments of the disclosed subject matter.

FIG. 13D illustrates a table comparing the heat and cool output of a standard air source heat pump of FIG. 13B with an exemplary air source heat pump with exhaust plenum system of FIG. 13C as well as the efficiency improvement provided by the exemplary air source heat pump with exhaust plenum system implemented in accordance with the disclosed subject matter.

DETAILED DESCRIPTION

Figure 1:
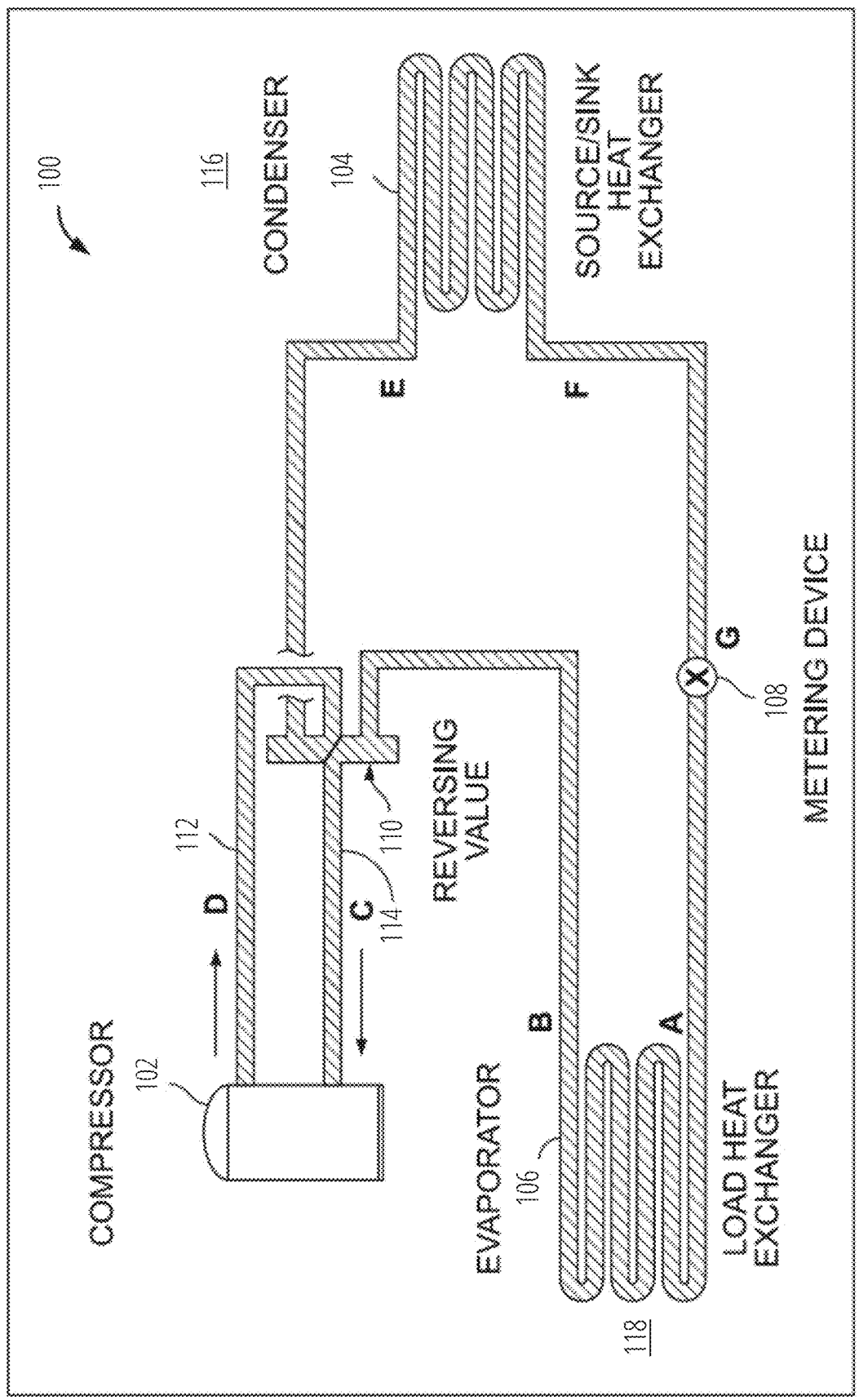
FIG. 1 illustrates a conventional thermodynamic cooling system.

A method for utilizing exhaust of a thermodynamic heating and cooling system for improved efficiency of the thermodynamic heating and cooling system is described herein. In some embodiments, the method includes drawing building infrastructure exhaust airflow from various parts of a building into an exhaust plenum system, and passing the building infrastructure exhaust airflow and ambient airflow over the coils of the heat pump or chiller, thereby mixing the building infrastructure exhaust airflow with ambient airflow to create an exhaust-ambient airflow mixture that increases the efficiency and capacity of the machine.

In some embodiments, mixing the building infrastructure exhaust airflow with ambient airflow increases the temperature of the exhaust-ambient airflow mixture. In some embodiments, mixing the exhaust air with ambient airflow decreases the temperature of the exhaust-ambient airflow mixture.

Described herein is a ventilation system and method for utilizing building infrastructure exhaust airflow in a thermodynamic heating and cooling system for improved efficiency through use of an exhaust plenum system. Building infrastructure exhaust airflow is reused in an air source heat pump system via the exhaust plenum system which allows the building infrastructure exhaust airflow to combine with ambient airflow, thereby creating an exhaust-ambient airflow mixture to be used by an air source heat pump, as opposed to using solely ambient airflow. The exhaust-ambient airflow mixture amount input to the air source heat pump is calculated based on the required BTUs of the thermodynamic system. The exhaust plenum system removes air from the conditioned space to increase indoor air quality, moisture control, temperature control, odor control, combustion byproducts, and to balance building pressure. This ventilation system and method can be utilized in either a commercial setting or a residential setting.

Described herein is a ventilation system for a building that includes an air source heat pump including a compressor, a condenser, a reversing valve, and an evaporator, and an exhaust plenum system configured to mix building infrastructure exhaust airflow with an ambient airflow to provide an exhaust-ambient airflow mixture to the air source heat pump, wherein use of the exhaust-ambient airflow mixture improves the efficiency of the air source heat pump.

In another example, a ventilation system utilizing exhaust of a thermodynamic heating and cooling system for improved efficiency is described herein. In the exemplary ventilation system, an exhaust plenum system increases the efficiency of a thermodynamic system by utilizing the energy (measured in BTUs) from building infrastructure exhaust airflow. By using a mixture of ambient airflow and building infrastructure exhaust airflow, the thermodynamic system can achieve higher productivity by extracting heat from the exhaust-ambient airflow mixture for heating purposes or reject heat from the exhaust-ambient airflow mixture for cooling purposes.

In some embodiments, the thermodynamic system is an air source heat pump. In some embodiments, the air source heat pump is configured to operate in two modes: one mode to produce chilled water, and one mode the produce hot water. This eliminates the need for both a chiller and boiler. In some embodiments, the air source heat pump is sized to ensure the airflow requirement for the air source heat pump is greater than the amount of building infrastructure exhaust airflow being removed. If the air source heat pump (ASHP) is sized for full load (i.e., the capacity of the ASHP to meet the maximum expected heating or cooling load under typical operating conditions), the air source heat pump requires more ambient airflow than building infrastructure exhaust airflow from the building. In some embodiments, the air source heat pump requires 6 to 7 times more ambient airflow than building infrastructure exhaust airflow. In the ventilation system design phase, heating and cooling ambient airflow conditions (to 70° F. and 72° F., respectively) may be set, and a determination may be made on the amount of the building infrastructure exhaust airflow rejected from the air source heat pump exceeds the needs of the building. In some embodiments, to ensure building infrastructure exhaust airflow is being consistently rejected at an adequate flow, the ambient airflow temperature, a supply airflow (e.g., conditioned air (heated or cooled) delivered to a habitable environment), and the building infrastructure exhaust airflow are individually monitored. If, for example, the ambient airflow temperature is between 52-55° F. and a supply air handling unit can economize without requiring any need for hot or chilled water, a source/sink fan of the air source heat pump is still enabled to properly reject building infrastructure exhaust airflow. In some embodiments, the compressors within the air source heat pump are disabled, but the source/sink fans on the air source heat pump will still be allowed to run.

Another method to accomplish proper, consistent airflow is to enable a minimum number of source/sink fans to run. In some embodiments, a controller of the air source heat pump tracks the number of source/sink fans running and the fan speed of each source/sink fan. In some embodiments, the air source heat pump controller monitors these two aspects to ensure the minimum airflow is met. In some embodiments, the minimum airflow is reset for occupied and unoccupied modes (i.e., modes in which the building is occupied or unoccupied).

The exhaust plenum system recovers the energy rejected from the building infrastructure as result of the air source heat pump functioning. Exhaust methods can be through all fluid mediums, with air or water most commonly. Areas of buildings that may provide building infrastructure exhaust airflow include bathrooms, kitchens, laboratories, garages, laundry rooms, storage areas, workshops, or other areas where pollutants and moisture accumulate. In some embodiments, the exhaust plenum system comprises one or more plenums and/or ducts.

For example, one or more inline exhaust fans may be in series with the exhaust plenum system. In some embodiments, if there is an inline exhaust fan in series with the exhaust plenum system, the exhaust plenum system is equipped with bypass dampers to allow the building infrastructure exhaust airflow to exit externally out of the side of the plenum if the air source heat pump is not in operation. One or more exhaust air handlers may include an energy wheel or the like.

The exhaust plenum system may, for example, be operable to recover waste building infrastructure energy by means of other processes, such as harnessing fluid mediums that generate heat or chilled water. Some examples include through process heat, boiler flue gases, data centers, compressed air systems, steam systems, laundry facilities, kitchen equipment, and power generation equipment.

For example, waste heat from industrial processes can be reused for preheating the ambient airflow entering the air source heat pump. Or, for boiler flue gases, heat from the boiler can be captured using economizers to preheat, via the building infrastructure exhaust airflow, air streams or coils to inject into the exhaust plenum system. In a data center example, heat generated by servers and related computer equipment can be recovered. In other examples, waste heat from air compressors in compressed air systems can be reused, and or condensate from steam systems can be recovered. In a laundry facility examples, heat from dryer exhausts and hot water from washing processes can be recovered and reused. While for kitchen equipment, heat from ovens, stoves, other cooking equipment, and appliances can be captured and potentially reused, for example. In further examples, power generation equipment produces heat from generators and turbines that can be recovered. The foregoing are intend as examples and other examples are also envisioned for recycling building energy.

The exhaust plenum system in some examples utilizes heating coils that inject heat into the exhaust stream as a supplement to the thermodynamic process of the air source heat pump. In some embodiments, these heating coils can utilize hot water, steam, electricity, or other forms or combinations of sources of heat generation.

The exhaust plenum system may be fabricated from a multitude of different materials. The exhaust plenum system may include durable materials such as galvanized steel or aluminum, plastics, and/or other materials.

In some embodiments, the exhaust plenum system is located and sized to fit the specific heat pump or chiller requirements of the ventilation system for the respective type of building (e.g., brick exterior, glass exterior, etc.) and building usage or specific application (e.g., data center, office building and the like).

The exhaust plenum system may be configured with one or more duct connections depending on the specific application. For example, the duct connections may be configured to be equipped with dampers or louvers to regulate airflow and prevent backflow of air when a thermodynamic system is not in operation. In addition, or alternatively, the exhaust plenum system may be equipped with a filter upstream at the duct connections to aid in filtering any items not intended to enter the air source heat pump.

In some embodiments, the exhaust plenum system may be configured with access points, such as removable panels or access doors, to facilitate inspection, cleaning, and maintenance of the ducts, duct connections, and associated components.

The exhaust plenum system may be configured to isolate rooftop equipment from the building structure, thereby preventing the transfer of vibrations and noise caused by operation of the equipment. Vibration transfer prevention helps to minimize disturbance to building occupants and also reduces the risk of structural damage. The transfer of vibrations and noise may be prevented by using vibration isolation elements that are comprised of materials that dampen vibrations, such as rubber, neoprene, spring isolators, or the like.

In some embodiments, the exhaust plenum system is equipped with a heat trace system or snow melt system to effectively manage and prevent snow or ice buildup. The heat trace system may, for example, include electric heaters or is fed from the building hot water supply system with coils strategically located within exhaust plenum system, or the like. Of course, the exhaust plenum system may be equipped with a drain to ensure proper drainage.

Figure 3:
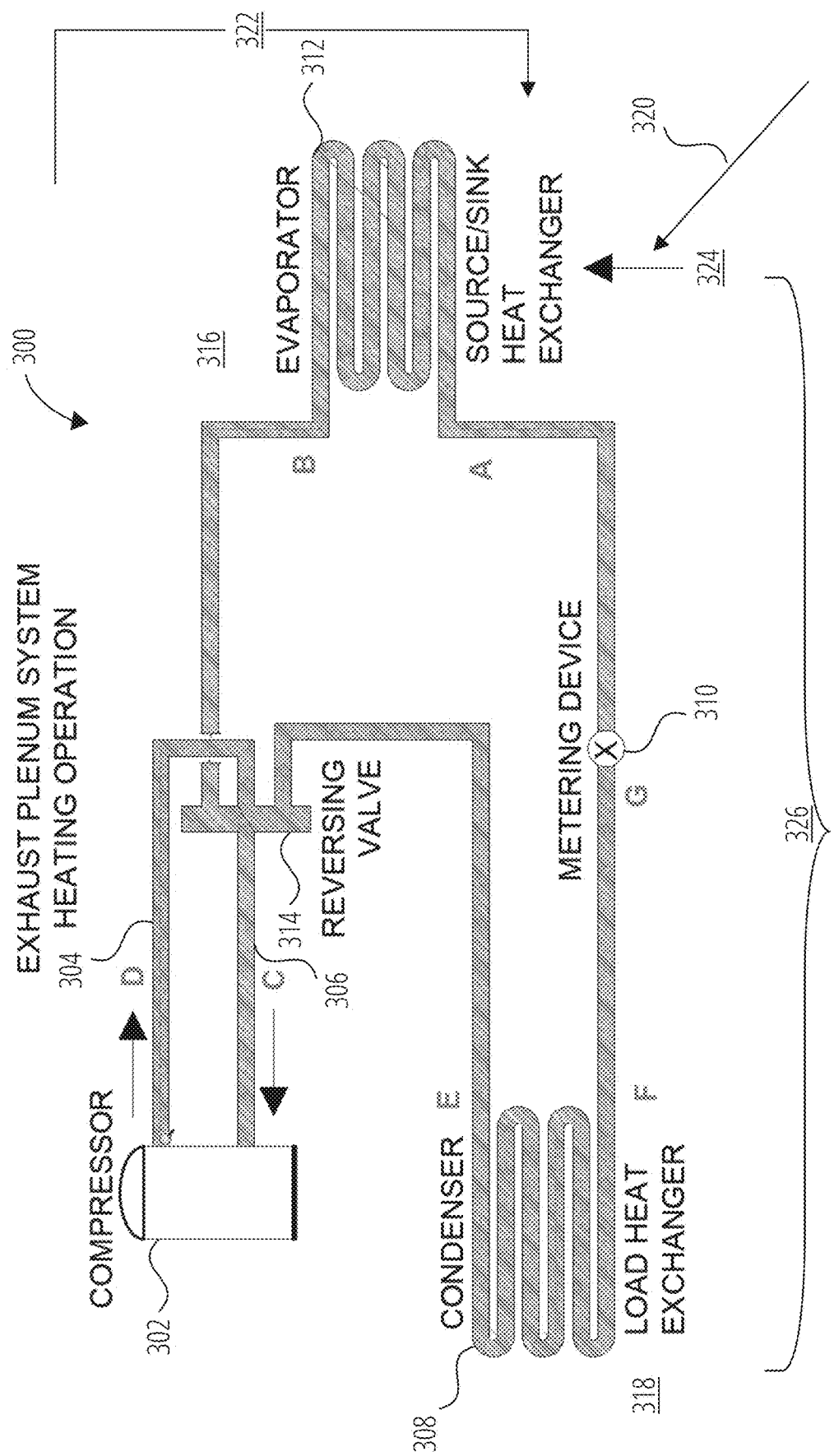
FIG. 3 illustrates a functional block diagram of a thermodynamic heating ventilation system equipped with an exhaust plenum system in accordance with an embodiment.

FIG. 3 illustrates a functional block diagram of a thermodynamic heating ventilation system equipped with an exhaust plenum system in accordance with an embodiment. The thermodynamic heating ventilation system with exhaust plenum system 300 may, for example, comprise a thermodynamic heating ventilation system 326 and an exhaust plenum system 322.

Figure 2:
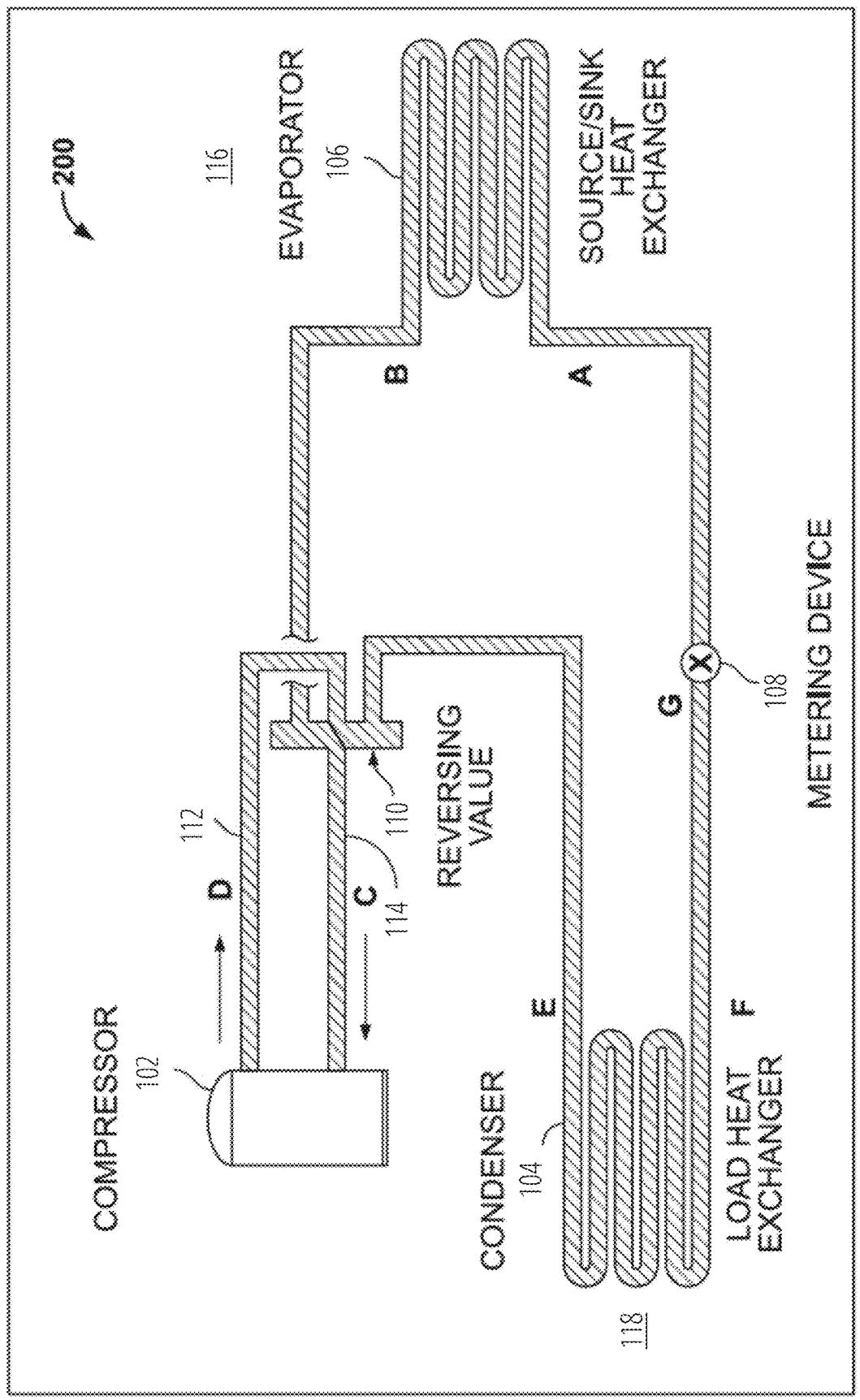
FIG. 2 illustrates a conventional thermodynamic heating ventilation system.

The thermodynamic heating ventilation system 326 may include a compressing unit 302, a compressor outlet 304, a compressor inlet 306, a condensing unit 308, a metering device 310, an evaporating unit 312, and a reversing valve 314 similar to the examples of FIGS. 1 and 2.

In some embodiments, the thermodynamic heating ventilation system 326 is an air source heat pump. In other embodiments, the thermodynamic heating ventilation system may be a ground source heat pump, water source heat pump, hybrid heat pump, solar assisted heat pump, or any other type of system capable of generating heat.

The exhaust plenum system is operable to collect a building infrastructure exhaust airflow 320 obtained perhaps from building infrastructure systems in the indoor environment 318, and cause the building infrastructure exhaust airflow 320 to mix with ambient airflow from outdoor environment 316 to form the exhaust-ambient airflow mixture 324.

In some embodiments, the evaporating unit 312 comprises one or more evaporating unit source/sink fans and an evaporating unit coil (both not shown in the example). The one or more evaporating unit source/sink fans blow exhaust-ambient airflow mixture 324 onto the evaporating unit coil. In some embodiments, after the exhaust-ambient airflow mixture 324 is passed over the evaporating unit coil of the evaporating unit 312, it is discarded from the evaporating unit 312 of the thermodynamic heating ventilation system 326 and may be recycled to be added to the building infrastructure exhaust airflow 320.

In some embodiments, the thermodynamic heating ventilation system with exhaust plenum system 300 comprises sensors that regulate the temperature of the indoor environment 318. The temperature of the indoor environment 318 is regulated through the use of a thermostat, which is an example of at least one of the regulating sensors.

Figure 4:
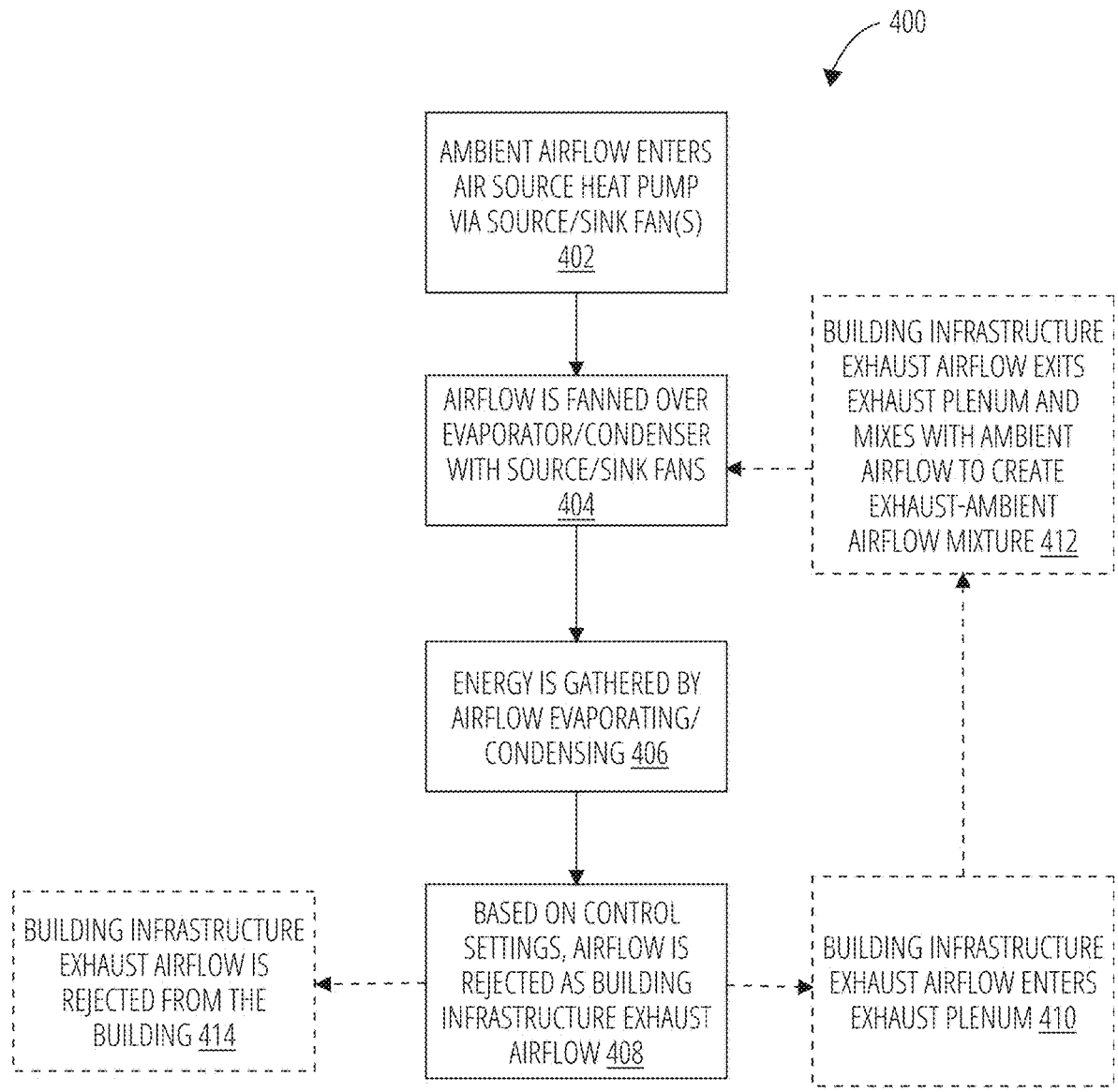
FIG. 4 illustrates an example method for the exemplary ventilation system.

FIG. 4 illustrates an example method for the exemplary ventilation system that recycles exhaust airflow rejected by ventilation system.

The process 400 is an example method of recycling exhaust airflow in which, at block 402, ambient airflow enters an air source heat pump via source/sink fan(s). The airflow is drawn or directed by the source/sink fans over either an evaporator or a condenser at block 404. The ASHP is operable to gather energy from the airflow by either a process of evaporation or condensation over the respective evaporator or condenser at block 406.

After block 406 and based on a ventilation system control setting, the airflow is rejected as building infrastructure exhaust airflow from either the evaporator or the condenser (block 408). Depending upon the control setting of the ventilation system, the building infrastructure exhaust airflow may be directed in at least one of two directions. For example, baffles in the ventilation system ductwork may either direct the building infrastructure exhaust airflow from the building (block 414) or into the exhaust plenum at block 410. At block 414, the building infrastructure exhaust airflow from source/sink fans into the outdoor environment, such as 316 of FIG. 3.

When the building infrastructure exhaust airflow is directed into an exhaust plenum at block 410, the building infrastructure exhaust airflow eventually exits the exhaust plenum, mixes with the ambient airflow, and is directed to the airflow that is fanned over the evaporator or condenser, thus restarting the cycle of process 400 at block 404.

Figure 5:
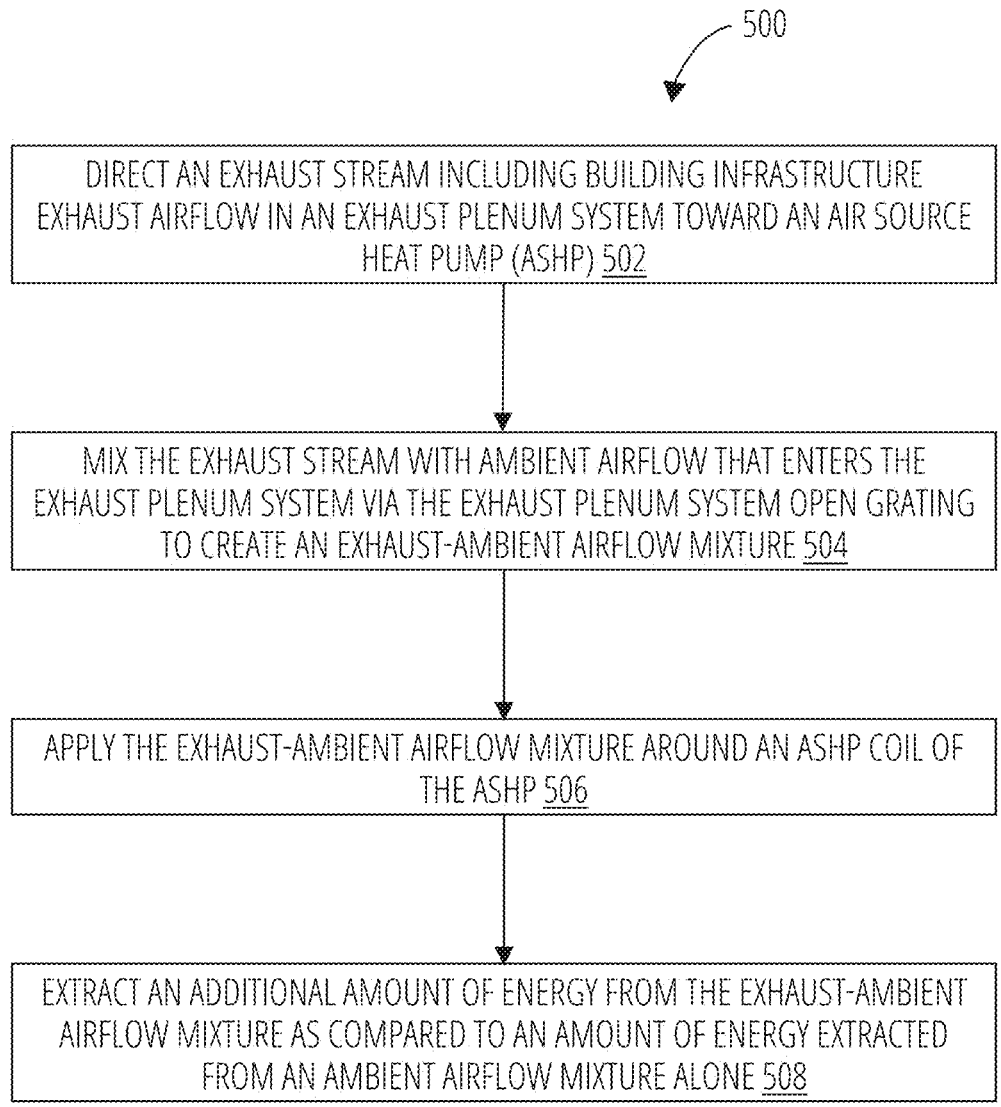
FIG. 5 illustrates an example method for the exemplary ventilation system.

FIG. 5 illustrates an example method for the exemplary ventilation system.

In block 502, the process 500 includes an exhaust plenum system that is configured to direct an exhaust stream including building infrastructure exhaust airflow toward an air source heat pump (ASHP). As shown in other examples, the exhaust plenum system may include an exhaust plenum system open grating that may be positioned adjacent to the ASHP. The exhaust plenum open grating may be to one or more sides of the ASHP. The one or more sides of the ASHP may include a top and/or a bottom of the ASHP.

The exhaust plenum open grating enables the exhaust stream that includes building infrastructure exhaust airflow to mix with ambient airflow that enters the exhaust plenum system via the exhaust plenum system open grating to create an exhaust-ambient airflow mixture (block 504).

In block 506 of process 500, the configuration of the ventilation system applies the exhaust-ambient airflow mixture around an ASHP coil of the ASHP.

Due to the increased energy provided by the exhaust stream, in block 508, the ASHP is able to extract additional amount of energy from the exhaust-ambient airflow mixture as compared to an amount of energy extracted from the ambient airflow mixture alone.

The additional energy as explained in the following enables the ASHP to operate more efficiently and meet the heating and cooling needs of the building more effectively as well as reducing energy costs.

Figure 6A:
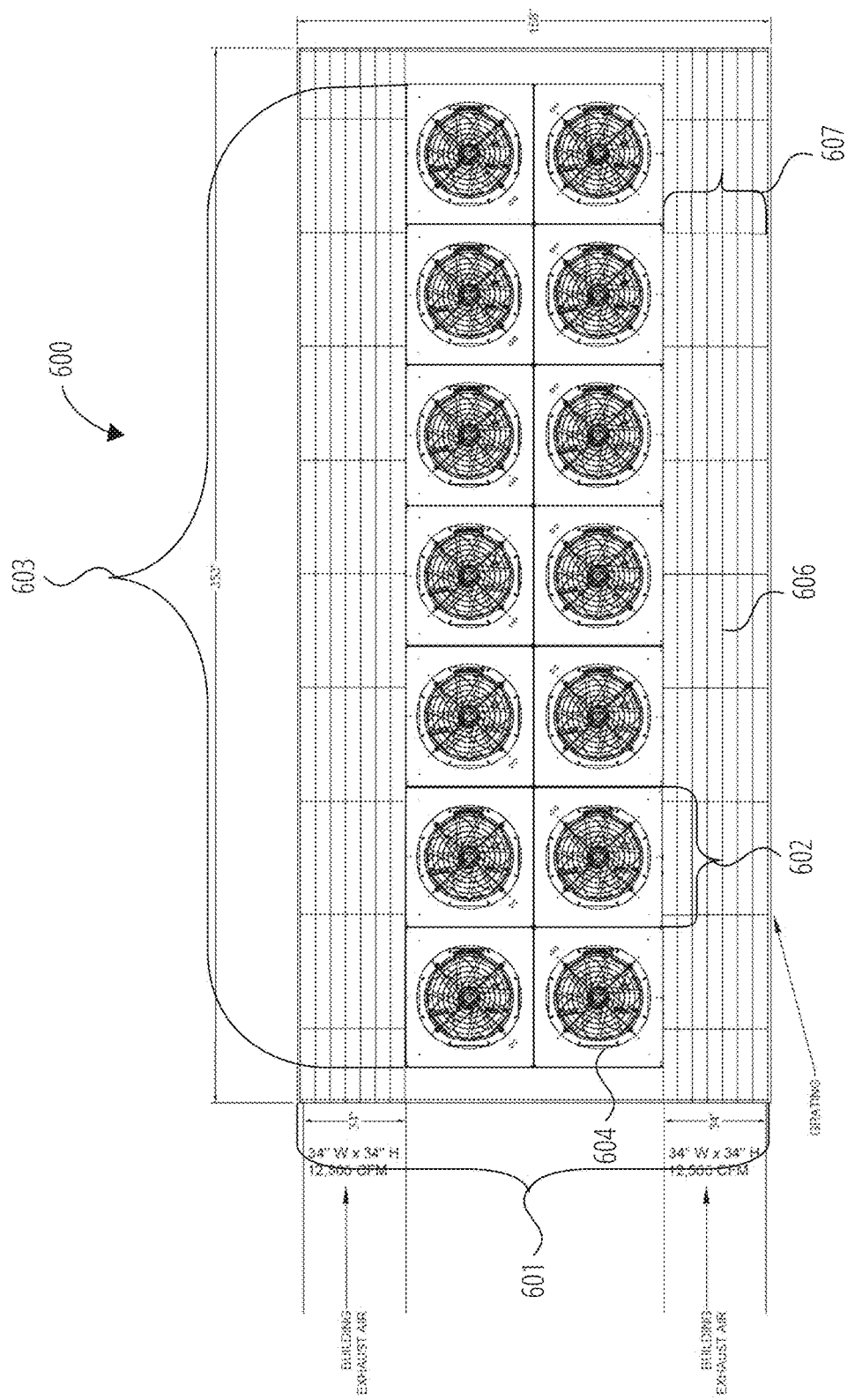
FIG. 6A illustrates a top-down view of an example of an air source heat pump with exhaust plenum system in accordance with an embodiment of the disclosed subject matter.

FIG. 6A illustrates a top-down view of an example of an air source heat pump with exhaust plenum system in accordance with an embodiment of the disclosed subject matter. The air source heat pump with exhaust plenum system 600 comprises an exhaust plenum 601, and an air source heat pump module bank 603.

In an example, the air source heat pump module bank 603 may include a number of individual air source heat pump modules 602 and a number of air source heat pump module source/sink fans 604. The exhaust plenum 601 may include an exhaust plenum walkway 607 having exhaust plenum open gratings 606.

The exhaust plenum 601, for example, may be positioned adjacent to the air source heat pump module bank 603, with respect to the air source heat pump module source/sink fans 604 being the tallest part of the air source heat pump with exhaust plenum system 600. In other examples, the exhaust plenum 601 is positioned centrally and adjacent to the air source heat pump module bank 603.

The air source heat pump with exhaust plenum system 600 may include a number of air source heat pump modules 602 depending upon the application. In the example of FIG. 6A, the air source heat pump with exhaust plenum system 600 utilizes fourteen air source heat pump modules 602. Of course, more or less than fourteen air source heat pump modules 602 may be used. Additionally, each air source heat pump module 602 may include an air source heat pump module source/sink fan 604.

In some embodiments, the air source heat pump with exhaust plenum system 600 comprises exhaust plenum open gratings 606 which form the exhaust plenum walkway 607. In some embodiments, the exhaust plenum open gratings 606 are configured for building infrastructure exhaust airflow to mix with ambient airflow, forming an exhaust-ambient airflow mixture. Depending upon control settings for the air source heat pump with exhaust plenum system 600, the exhaust-ambient airflow mixture may configured to be applied to an evaporating unit coil or a condensing unit coil. Alternatively, the exhaust-ambient airflow mixture may be configured to be rejected by the air source heat pump module source/sink fans 604 to the outdoor environment.

Figure 6B:
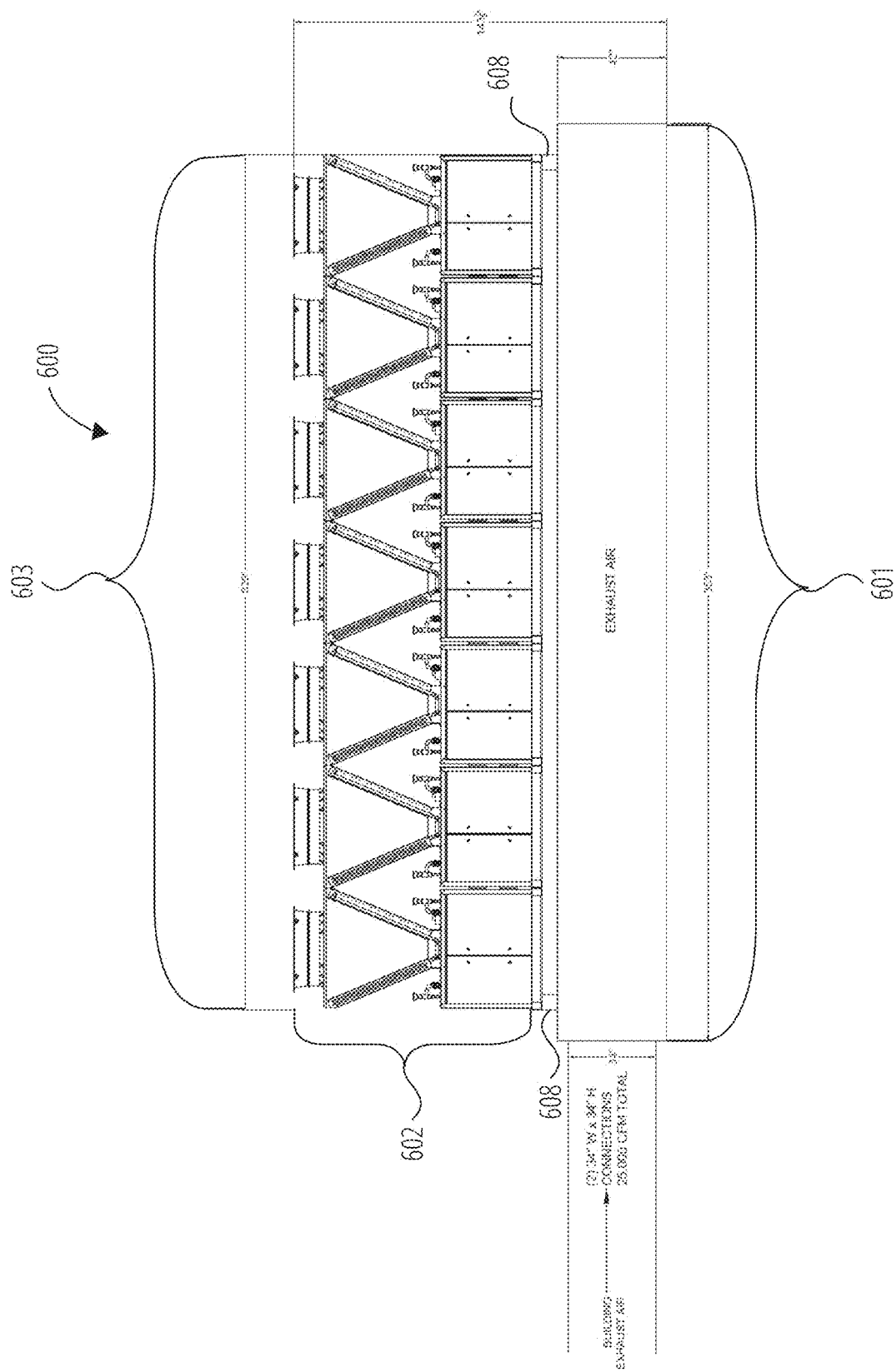
FIG. 6B illustrates a side view of the example of the air source heat pump with exhaust plenum system in accordance with an embodiment of the disclosed subject matter.

FIG. 6B illustrates a side view of the example of the air source heat pump with exhaust plenum system in accordance with an embodiment of the disclosed subject matter. Shown in the side view of FIG. 6B, the air source heat pump with exhaust plenum system 600 comprises an air source heat pump module bank 603 comprising air source heat pump modules 602, an exhaust plenum 601, and air source heat pump frames 608.

In some embodiments, the exhaust plenum 601 and the air source heat pump module bank 603 are longitudinally separated by air source heat pump frames 608 (shown in FIG. 6B).

In some embodiments, the air source heat pump module bank 603 is positioned above the exhaust plenum 601 by the use of air source heat pump frames 608.

Figure 6C:
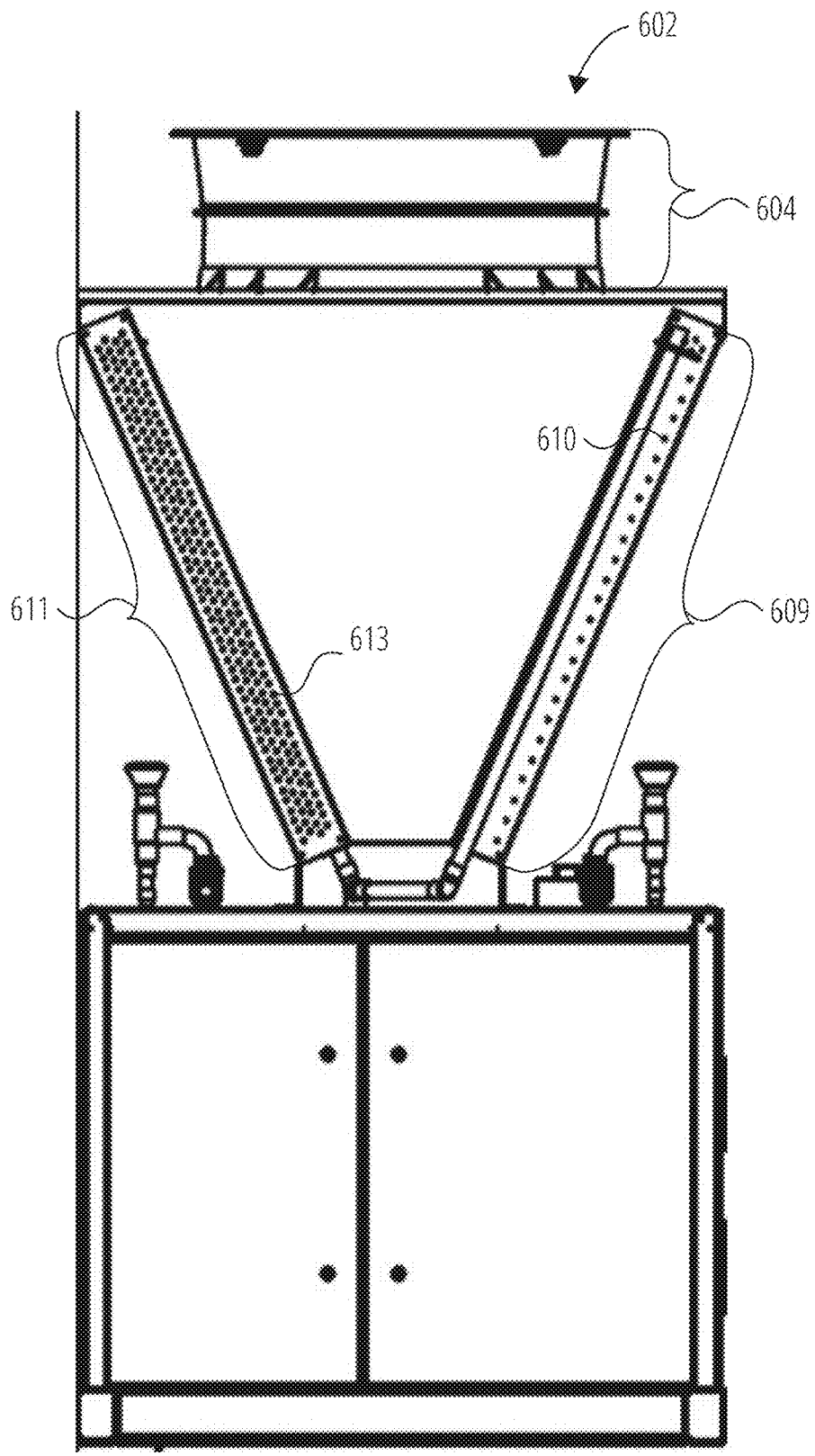
FIG. 6C illustrates another side view of the example of the air source heat pump with exhaust plenum system in accordance with an embodiment of the disclosed subject matter.

FIG. 6C illustrates another side view of the example of the air source heat pump with exhaust plenum system in accordance with an embodiment of the disclosed subject matter. As mentioned above, the air source heat pump module 602 includes an air source heat pump module source/sink fan 604, an evaporating unit 609, evaporating unit coils 610, a condensing unit 611, and condensing unit coils 613.

In some embodiments, the condensing unit 611 includes more coils than the evaporating unit 609. In other embodiments, the condensing unit 611 includes the same amount of coils as the evaporating unit 609. In yet another embodiment, the condensing unit 611 may include fewer coils than the evaporating unit 609.

The number of coils for either the evaporating unit 609 or the condensing unit 611 may be related to the capacity of the ASHP or the like.

Figure 6D:
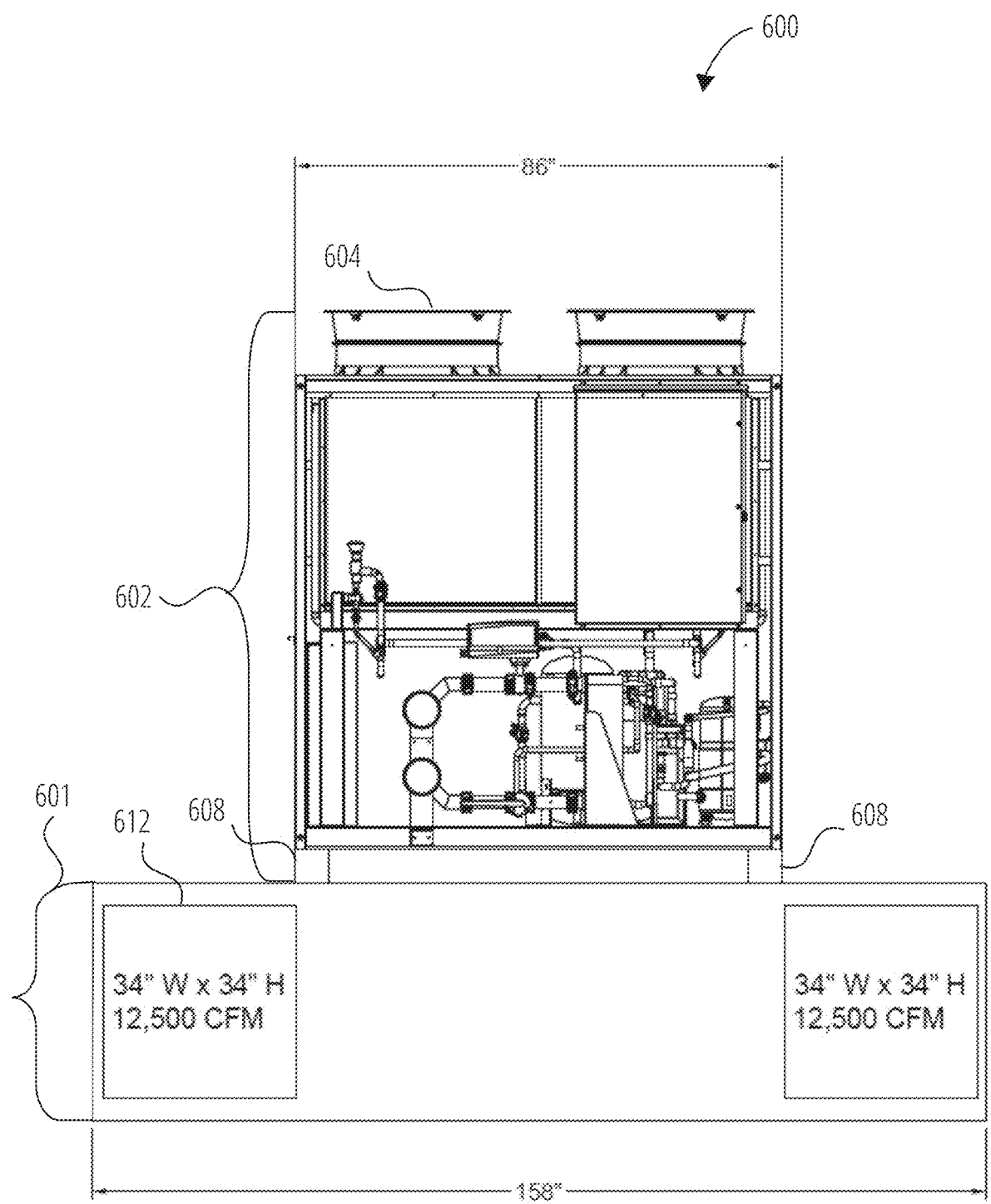
FIG. 6D illustrates a side view of the example of the air source heat pump with exhaust plenum system in accordance with an embodiment of the disclosed subject matter.

FIG. 6D illustrates a side view of the example of the air source heat pump with exhaust plenum system in accordance with an embodiment of the disclosed subject matter. In this exemplary view, the air source heat pump with exhaust plenum system 600 are shown in a configuration where the exhaust plenum 601 is below and adjacent to the air source heat pump module 602. In this example, the air source heat pump frame 608 supports the air source heat pump module 602. The exhaust plenum system duct connection 612 may be configured to direct the building infrastructure exhaust airflow toward the air source heat pump module source/sink fan 604.

The foregoing descriptions in FIG. 6A to FIG. 6D provide a description of and exemplary configuration of a ventilation system having an exhaust plenum system configured to use the advantageous features described herein.

Figure 7:
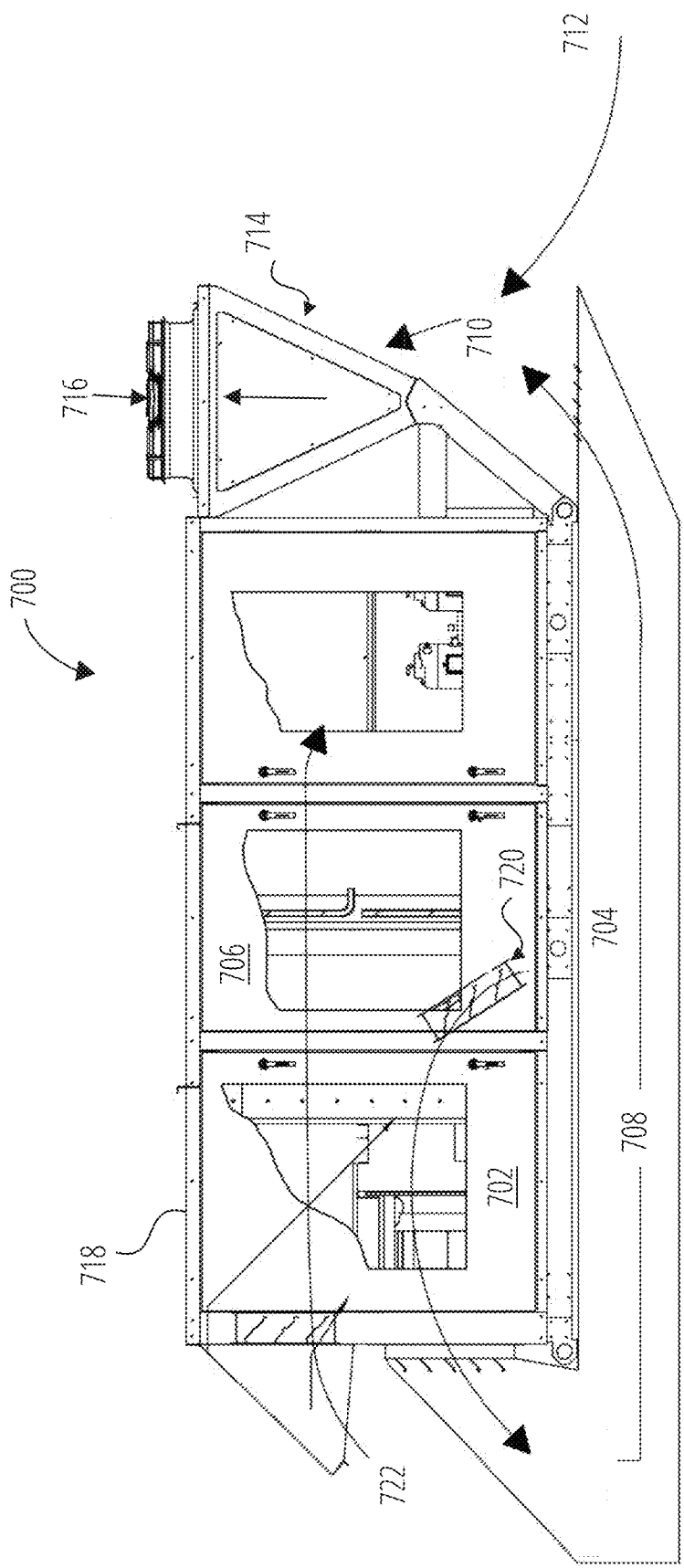
FIG. 7 illustrates an example of a packaged direct expansion air source heat pump equipped with an exhaust plenum system in accordance with an embodiment.

FIG. 7 illustrates an example of a packaged direct expansion air source heat pump equipped with an exhaust plenum system in accordance with the disclosed subject matter.

A packaged direct expansion (DX) air source heat pump is a decentralized ASHP suitable for providing, for example, air conditioning (i.e., cooling and heating) to multifamily buildings, small offices, and the like.

The exhaust plenum system and packaged DX air source heat pump 700 of FIG. 6 may include, for example, an air source heat pump 718 and an exhaust plenum 704.

In this example, the air source heat pump 718 may include an exhaust blower 702, a return air damper 706, a condensing unit coils 714, energy wheel 720, exhaust fan 716, a compressor cabinet 722, and an air source heat pump 718.

The exhaust plenum 704 is configured to direct the building infrastructure exhaust airflow 708 toward the condensing unit coils 714.

The exhaust plenum system when installed for in series with the air source heat pump 718, that utilizes an energy wheel it can still use the air being rejected to raise or lower the temperature entering the air source heat pump as the air leaving the energy wheel 720 may be at a lower temperature in cooling systems or a higher temperature in heating systems than the ambient airflow 712. Using the rejected air reduces the amount of work the compressor needs to do since the operating pressure of the air source heat pump 718 is lower. FIG. 7 is an example of the exhaust plenum system being tied to a packaged DX air source heat pump unit.

In operation, the exhaust air is drawn from the building via the exhaust blower 702, and energy is recovered through energy wheel 720, the exhaust air supplemented with the recovered energy is exhausted from the unit ducted as to the exhaust plenum 704 as building infrastructure exhaust airflow 708. The building infrastructure exhaust airflow 708 leaves the exhaust plenum 704 and mixes with the outdoor ambient airflow 712 to allow for a better operating point, for example, for the refrigeration system at a lower pressure.

For example, the air leaving the wheel is expected to be below the designed for cooling ambient air temperature and above the designed for heating ambient air temperature. See below typical performance when an energy wheel is used. In TABLE IV below, the abbreviation DB is a "dry bulb" temperature and represents the air temperature without accounting for evaporation or relative humidity, while the abbreviation WB is a "wet bulb" temperature and considers the cooling effect due to moisture and evaporation.

TABLE IV

EXAMPLE DATA FOR A DX ASHP

| Cooling | | Heating | |
|---|---|---|---|
| Outside Air DB/WB: | 91.0/73.0 F. | Outside Air DB/WB: | 0.0/−1.0 F. |
| Pre-treated OA DB/WB: | 80.1/66.7 F. | Pre-treated OA DB/WB: | 43.3/36.9 F. |
| Return Air DB/WB: | 75.0/63.0 F. | Return Air DB/WB: | 70.0/54.0 F. |
| Exhaust Air DB/WB: | 85.4/69.5 F. | Exhaust Air DB/WB: | 20.4/20.4 F. |

In an example, the exhaust plenum 704 is configured to be in series with the duct connections of the air source heat pump 718 that is utilizing the energy wheel 720. In some embodiments, the exhaust plenum 704 uses the building infrastructure exhaust airflow 708 being rejected by the exhaust fan 716 to boost or lower the temperature entering the condensing unit coils 714, as the building infrastructure exhaust airflow 708 in the exhaust stream leaving the energy wheel has a lower temperature in cooling design or higher temperature in heating design than the ambient airflow 712. Thus, the amount of work the compressing unit needs to do is reduced, as operating pressure of the unit is lowered.

In a more detailed operational example, the building infrastructure exhaust airflow 708 is removed from the building infrastructure, for example, from a kitchen, laundry dryers, hot water heaters, servers and IT equipment, or boiler exhausts, the energy is recovered through an energy wheel, and the building infrastructure exhaust airflow 708 from the unit is ducted to the exhaust plenum 704. The building infrastructure exhaust airflow 708 mixes with the ambient airflow 712 to form exhaust-ambient airflow mixture 710 to allow for a better operating point for the refrigeration system at a lower pressure.

In some embodiments, during certain periods of the year, the building infrastructure exhaust airflow is bypassed to not mix with the ambient airflow if the temperatures are not advantageous.

Figure 8A:
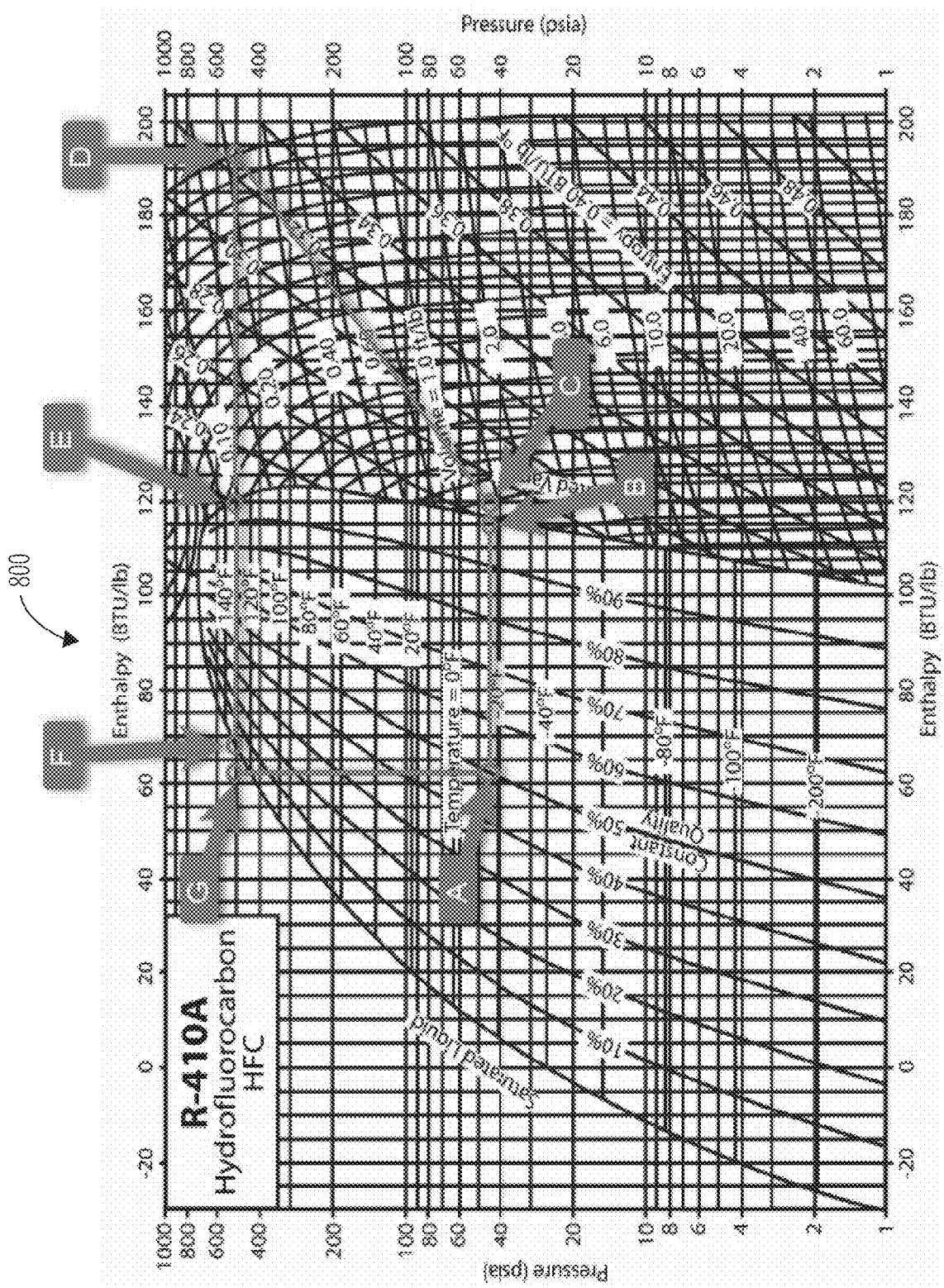
FIG. 8A illustrates a chart of the pressure-enthalpy refrigeration cycle of a thermodynamic heating ventilation system equipped with an exhaust plenum system as disclosed herein at 0° F. ambient airflow temperature.
Figure 17:
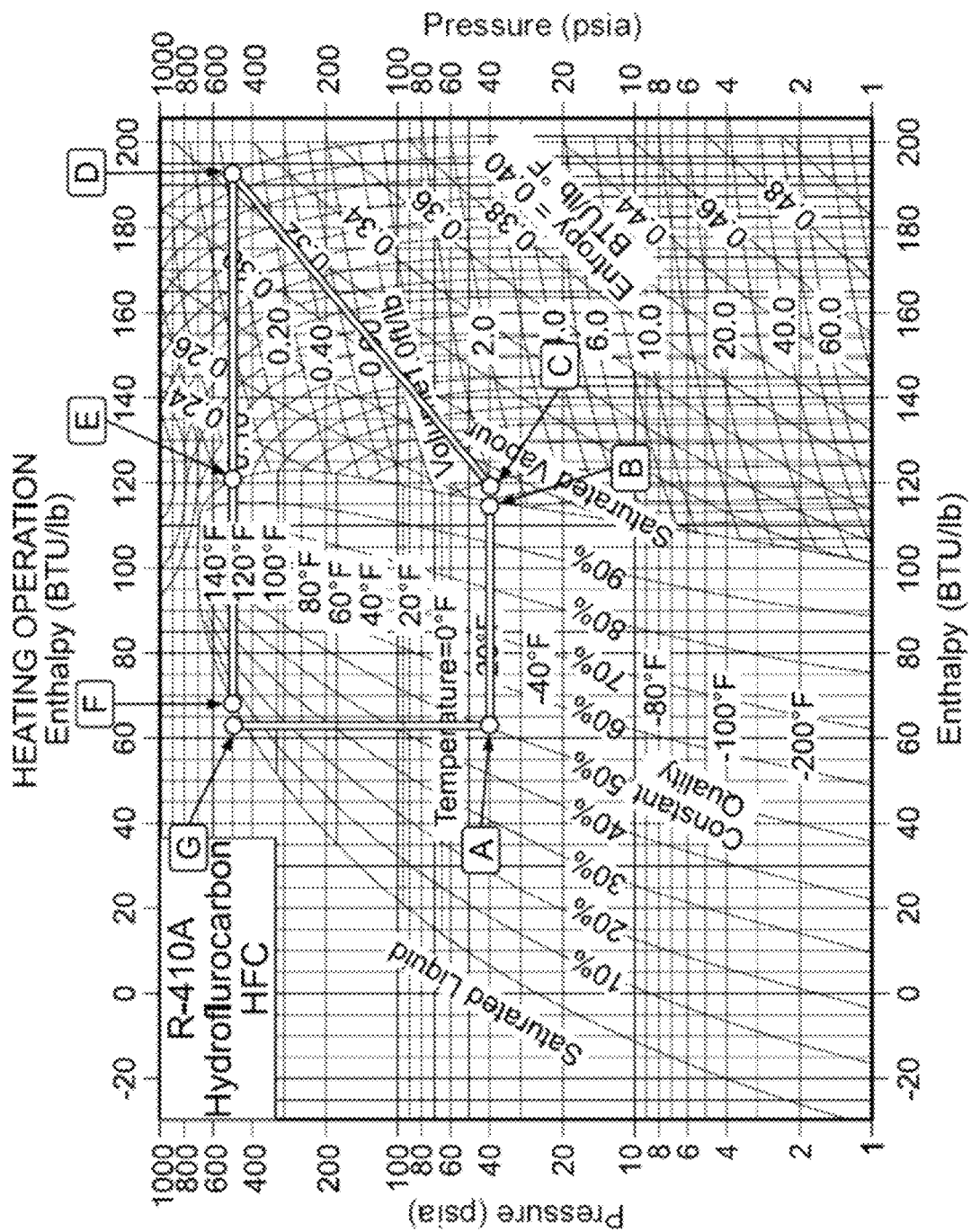
FIG. 17 illustrates an example of a pressure-enthalpy refrigeration cycle of a conventional thermodynamic heating ventilation system at 0° F. ambient airflow temperature.

FIG. 8A illustrates a chart of the pressure-enthalpy refrigeration cycle of a conventional thermodynamic heating ventilation system equipped with an exhaust plenum system at 0° F. ambient airflow temperature. The pressure-enthalpy with exhaust plenum chart 800 is similar to FIG. 17 described in the Background section of this application. The line A-B in both charts is the evaporation line that is at a value of either pounds per square inch absolute (PSIA) or a temperature (at some temperature below zero degrees F.). However, in FIG. 17, and the PSIA on the standard system represented by FIG. 17 is 40 or −21 degrees F. While, in contrast to FIG. 17, the evaporation line for a system with an exhaust plenum system as described herein is shown in chart 800 of FIG. 8A at a PSIA of 45 or −16 degrees F.

In an example described with reference to FIG. 3, during heating operation shown in pressure-enthalpy with exhaust plenum chart 800, the performance of the thermodynamic heating ventilation system may be improved (i.e., increased) due to the exhaust-ambient airflow mixture having an elevated exhaust-ambient airflow mixture temperature passing through the evaporating unit coils, as compared to only ambient airflow that has a lower temperature. This is due, for example, to the reduced suction temperature and the suction temperature is elevated with the exhaust plenum system. Suction temperature refers to the temperature of the refrigerant vapor as it leaves the evaporator coil and enters the compressor.

In pressure-enthalpy with exhaust plenum chart 800, between points A and C, for example, the exhaust-ambient airflow mixture has a higher exhaust-ambient airflow mixture temperature as compared to a typical thermodynamic heating ventilation system (e.g., −16 degree F. versus −21 degree F.), and when the exhaust-ambient airflow mixture is used in the thermodynamic heating ventilation system with exhaust plenum system 300 of FIG. 3. As a result, the thermodynamic heating ventilation system with exhaust plenum system has a higher ambient airflow temperature and operates at a higher evaporating pressure, which increases efficiency and increases capacity of the thermodynamic heating ventilation system with exhaust plenum system as compared to a thermodynamic heating ventilation system without the exemplary exhaust plenum system described in the earlier examples.

FIG. 8B illustrates a table of typical performance values of a thermodynamic heating ventilation system equipped with an exhaust plenum system as shown in the exemplary chart of FIG. 8A. The typical system performance table 802 shows each of the respective values at points A-G of the pressure-enthalpy with exhaust plenum chart 800 shown in FIG. 8A.

Figure 8C:
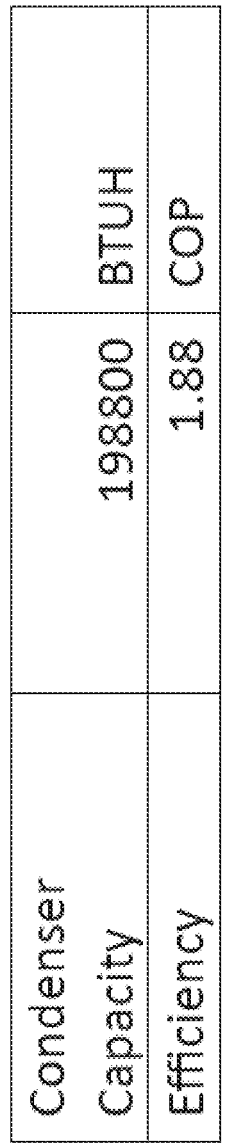
FIG. 8C illustrates a table displaying the condenser capacity and efficiency of the exemplary thermodynamic heating ventilation system equipped with an exhaust plenum system having a pressure-enthalpy refrigeration cycle as shown in the exemplary chart of FIG. 8A.

FIG. 8C illustrates a table displaying the condenser capacity and efficiency of a thermodynamic heating ventilation system equipped with an exhaust plenum system in accordance with an embodiment. The condenser capacity and efficiency table 804 shows thermodynamic heating ventilation system with exhaust plenum system has a 6.82% larger condensing unit capacity and a 5.62% larger coefficient of performance (COP). COP may be used to quantify how effectively an ASHP transfers heat relative to the electrical power it consumes.

FIG. 8D illustrates a table displaying the heating capacity of a standard air source heat pump and an air source heat pump with exhaust plenum system in accordance with several embodiments of the disclosed subject matter. In comparison table 806, due to the exhaust-ambient airflow mixture temperature (i.e., mixed air temperature (MAT)) entering the exemplary air source heat pump with exhaust plenum system as described with reference to earlier examples, the efficiency and capacity of the unit is increased, as opposed to only ambient airflow entering the standard air source heat pump. In this example, the examples pertain to the ambient airflow at 0° F., 10° F., 20° F., and 30° F., shown in the first column. In some embodiments, the ambient airflow is below 0° F. Alternatively, the ambient airflow may be any temperature between 10° F. and 30° F. In other alternatives, the ambient airflow is above 30° F.

The second and third columns indicate information pertaining to the standard air source heat pump. The second column displays the corresponding thousands of BTUs per hour (MBH) for each ambient airflow temperature. MBH quantifies the rate of energy transfer in heating and cooling systems, and is used to express the heating or cooling capacity. The third column displays the coefficient of performance (COP) for each ambient airflow temperature. COP is a dimensionless value that measures the electrical efficiency of heating and cooling systems. In this example, COP is calculated by dividing the heating output by the electrical energy input.

The fourth and fifth columns indicate information pertaining to the air source heat pump with exhaust plenum system. The fourth column displays the MBH for each ambient airflow temperature. The fifth columns displays the COP for each ambient airflow temperature.

In an embodiment in which the ambient airflow is 0° F., the air source heat pump with exhaust plenum system produces approximately 8.21% more MBH than the standard air source heat pump and the COP is approximately 5.61% higher.

In an embodiment in which the ambient airflow is 10° F., the air source heat pump with exhaust plenum system produces approximately 6.87% more MBH than the standard air source heat pump and the COP is approximately 3.74% higher.

In an embodiment in which the ambient airflow is 20° F., the air source heat pump with exhaust plenum system produces approximately 5.57% more MBH than the standard air source heat pump and the COP is approximately 4.22% higher.

In an embodiment in which the ambient airflow is 30° F., the air source heat pump with exhaust plenum system produces approximately 3.94% more MBH than the standard air source heat pump and the COP is approximately 2.26% higher.

FIG. 9 illustrates a table displaying exhaust-ambient airflow mixture temperature in accordance with an embodiment of the disclosed subject matter.

The temperature table 900 shows mixed air temperatures (MAT)) entering an air source heat pump with exhaust plenum system at various ambient airflows (i.e., outside air temperatures (OAT)) Building loads and airflows differ based on the building type and geographical location, which directly impacts equipment sizing and performance.

In this example, the exhaust plenum system is applied to a single 30 ton air source heat pump requiring 24,000 cubic feet per minute (CFM) of airflow. The building infrastructure exhaust airflow entering the exhaust plenum system may, for example, be set at 2,000 CFM with a building infrastructure exhaust airflow temperature of 72° F.

The exhaust plenum system may be applied to a 1-ton air source heat pump (i.e., the capacity of the air source heat pump is 12,000 BTU, where 12,000 BTU is equal to 1-ton). While the example of FIG. 9 is 1-ton, it is envisioned that the exhaust plenum system as described herein may be applied to a multi-thousand ton air source heat pump. For example, a residential building may be equipped with an air source heat pump that requires 50 CFM of airflow, while a large laboratory building may require an air source heat pump capable of handling over 100,000 CFM.

In some examples as contemplated herein, the exhaust airflow entering the exhaust plenum system may be configured to handle approximately 500-24,000 CFM of building infrastructure exhaust airflow. However, in some embodiments, the building infrastructure exhaust airflow entering the exhaust plenum system is less than approximately 500 CFM. In other embodiments, the building infrastructure exhaust airflow entering the exhaust plenum system is greater than approximately 24,000 CFM.

The temperature of the building infrastructure exhaust airflow may be indicative of the amount of energy that may be extracted from the building infrastructure exhaust airflow. In some embodiments, the building infrastructure exhaust airflow temperature is approximately 65° F.-78° F. In other embodiments, the building infrastructure exhaust airflow temperature is below 65° F. or the like. In yet other embodiments, the building infrastructure exhaust airflow temperature is above 78° F. or the like.

Figure 10A:
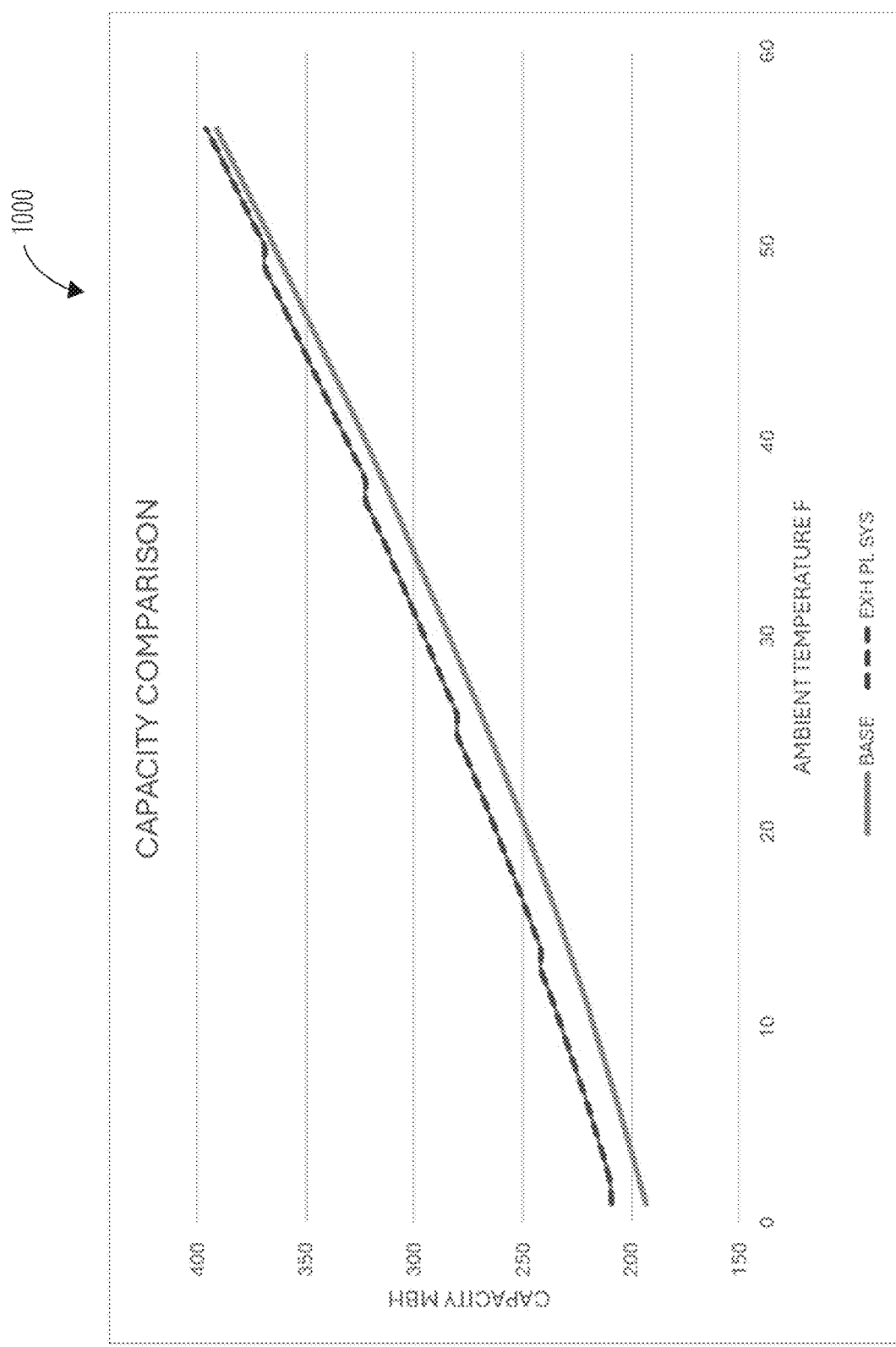
FIG. 10A illustrates a graph displaying an exemplary comparison of the heating capacity of a standard air source heat pump to an exemplary air source heat pump with exhaust plenum system as described herein as a function of temperature.

FIG. 10A illustrates a graph displaying the heating capacity of a standard air source heat pump and an air source heat pump with exhaust plenum system as a function of temperature.

In the graph 1000, the dashed line represents the air source heat pump with exhaust plenum system and the solid line represents the standard air source heat pump. As shown in the graph, as temperatures decrease, the difference in capacity between the air source heat pump with exhaust plenum system and the standard air source heat pump increases, and the efficiency of the air source heat pump with exhaust plenum system increases as temperature decreases compared to the standard air source heat pump.

FIG. 10B illustrates a table displaying the cooling capacity of a standard air source heat pump and an air source heat pump with exhaust plenum system in accordance with four embodiments. In chart 1002, the performance of a standard air source heat pump (i.e., without use of the exemplary exhaust plenum system) and the performance of an air source heat pump with exhaust plenum system is shown. Due to the MAT entering the air source heat pump with exhaust plenum system, efficiency and capacity of the unit is increased, as opposed to only ambient airflow entering the standard air source heat pump. In this example, the four embodiments pertain to the ambient airflow at 80° F., 85° F., 90° F., and 95° F., shown in the first column. In some embodiments, the ambient airflow is below 80° F. In some embodiments, the ambient airflow is any temperature between 80° F. and 95° F. In some embodiments, the ambient airflow is above 95° F.

The second and third columns indicate information pertaining to the standard air source heat pump. The second column displays the thousands of BTUs per hour (MBH) for each ambient airflow temperature. The third column displays the COP for each ambient airflow temperature. In this example, the COP is calculated by dividing the cooling output by the electrical energy input.

The fourth and fifth columns indicate information pertaining to the air source heat pump with exhaust plenum system. The fourth column displays the MBH for each ambient airflow temperature. The fifth columns displays the COP for each ambient airflow temperature.

In the embodiment in which the ambient airflow is 80° F., the air source heat pump with exhaust plenum system produces 4.04% less MBH than the standard air source heat pump and the COP is 3.90% higher.

In the embodiment in which the ambient airflow is 85° F., the air source heat pump with exhaust plenum system produces 2.58% more MBH than the standard air source heat pump and the COP is 4.12% higher.

In the embodiment in which the ambient airflow is 90° F., the air source heat pump with exhaust plenum system produces 9.16% more MBH than the standard air source heat pump and the COP is 5.77% higher.

In the embodiment in which the ambient airflow is 95° F., the air source heat pump with exhaust plenum system produces 17.31% more MBH than the standard air source heat pump and the COP is 6.2% higher.

Figure 11A:
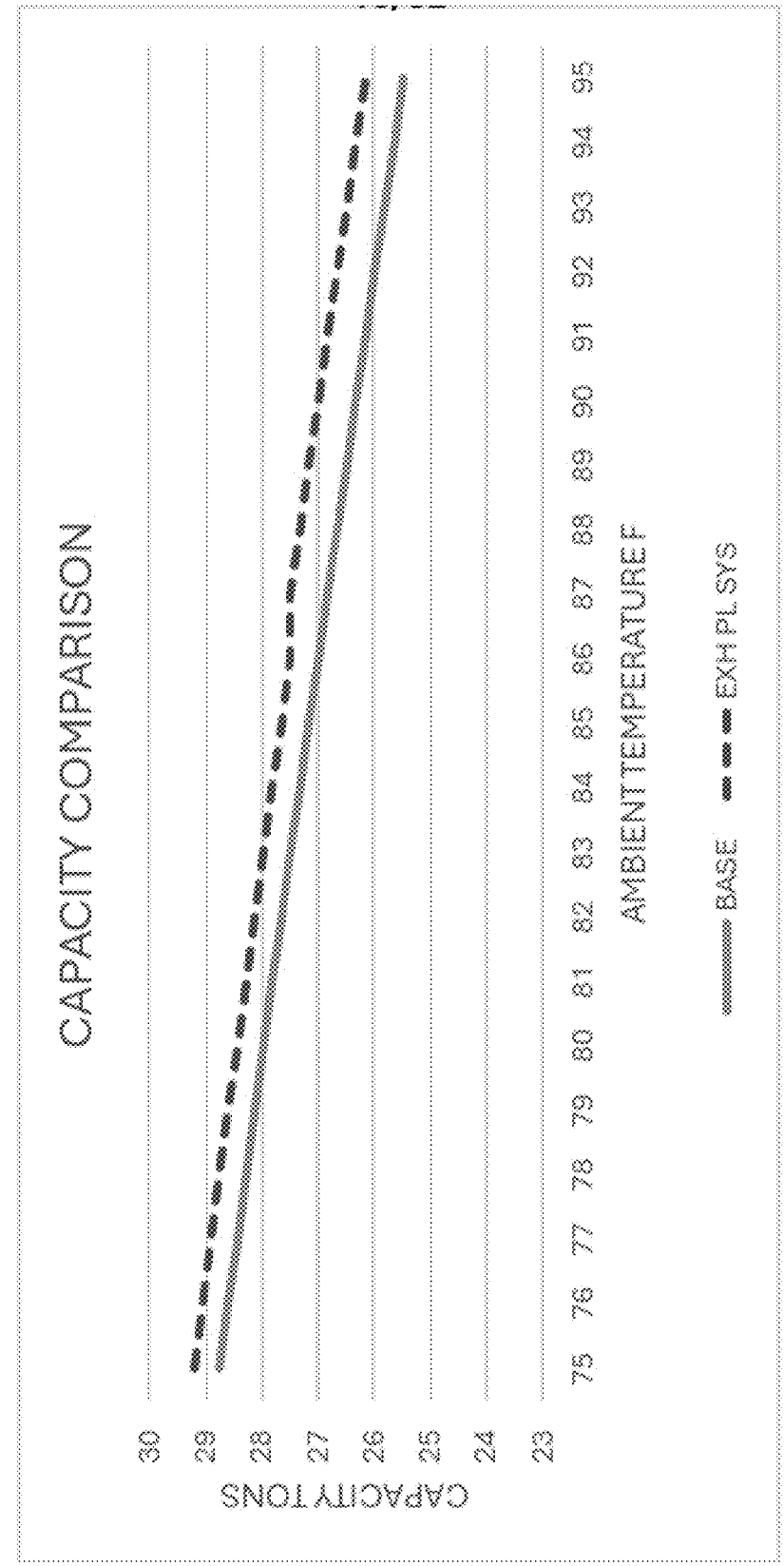
FIG. 11A illustrates a graph displaying exemplary cooling capacity of a standard air source heat pump and an exemplary air source heat pump with exhaust plenum system as a function of temperature as described herein.

FIG. 11A illustrates a graph displaying the cooling capacity of a standard air source heat pump and an air source heat pump with exhaust plenum system as a function of temperature. In graph 1102, the dashed line represents the air source heat pump with exhaust plenum system and the solid line represents the standard air source heat pump. As shown in the graph 1102, as temperatures increase, the difference in capacity between the air source heat pump with exhaust plenum system and the standard air source heat pump increases, and the efficiency of the air source heat pump with exhaust plenum system increases as temperature increases compared to the standard air source heat pump.

FIG. 11B illustrates a table depicting an air source heat pump with exhaust plenum system heating capacity in accordance with eleven embodiments. In these examples, the air source heat pump with exhaust plenum system is used in connection to a laboratory setting for a full year as shown in chart 1104.

Column 1 of chart 1104 indicates the number of air source heat pump modules (shown in FIG. 6B and FIG. 6C) in the laboratory, ranging from 6 to 16. In some embodiments, the number of air source heat pump modules in a laboratory is fewer than 6. In some embodiments, the number of air source heat pump modules in a laboratory is greater than 16.

Column 2 indicates the total ambient airflow required by the source/sink fans, measured in CFM. This is calculated by multiplying the required airflow of the air source heat pump with exhaust plenum system (which is 24,000 CFM in each embodiment) by the number of air source heat pump modules in the given embodiment. For example, for an air source heat pump with exhaust plenum system comprising 10 air source heat pump modules, the required total airflow is 240,000 CFM.

Column 3 indicates the laboratory building infrastructure exhaust airflow, measured in CFM. The laboratory building infrastructure exhaust airflow is used in the exhaust plenum system. In some embodiments, laboratory space requires 1.5-2 CFM per square foot of ambient airflow. This requirement is based on the number of air changes per hour as well as the load of the laboratory space.

The CFM of supply airflow and building infrastructure exhaust airflow is calculated using the following equation:

$$(SQ)(A_A) = (A_S + A_E)$$

In this equation, SQ represents the square footage of the building (in ft^2), $A_A$ represents the required amount of ambient airflow (in CFM/ft^2), $A_S$ represents the supply airflow, such as intake or air conditioning that provides air to the indoor environment, such as indoor environment 318, or the like (in CFM), and $A_E$ represents the building infrastructure exhaust airflow (in CFM).

In this embodiment, with the lab building comprising 25,000 square feet and laboratory space requiring 2 CFM per square foot of ambient airflow, the laboratory building requires 50,000 CFM supply airflow and building infrastructure exhaust airflow.

Column 4 indicates the ambient airflow temperature, measured in ° F. In this embodiment, for each number of air source heat pump modules, the ambient airflow temperature is 0° F. This is to ensure standardization and for ease of comparison between the number of air source heat pump modules. In some embodiments, the ambient airflow temperature is lower than 0° F. In some embodiments, the ambient airflow temperature is higher than 0° F.

Column 5 indicates the building infrastructure exhaust airflow temperature, measured in ° F. In this embodiment, for each of the air source heat pump modules, the building infrastructure exhaust airflow temperature is 70° F. This is to ensure standardization and for ease of comparison between the number of air source heat pump modules. In some embodiments, the building infrastructure exhaust airflow temperature is lower than 70° F. In some embodiments, the building infrastructure exhaust airflow temperature is higher than 70° F.

Column 6 indicates the exhaust-ambient airflow mixture temperature, measured in ° F. In some embodiments, the exhaust-ambient airflow mixture temperature is greater than 24.3° F. In some embodiments, the exhaust-ambient airflow mixture temperature is any number between 24.3° F. and 9.1° F. In some embodiments, the exhaust-ambient airflow mixture temperature is less than 9.1° F.

Column 7 indicates the single air source heat pump module capacity, measured in MBH. The single air source heat pump module capacity is calculated by manufacturers and provided to users. In some embodiments, the single air source heat pump module capacity is less than 265.40 MBH. In some embodiments, the single air source heat pump module capacity is any number between 265.40 MBH and 217.06 MBH. In some embodiments, the single air source heat pump module capacity is greater than 217.06 MBH.

Column 8 indicates the total capacity, measured in MBH. The total capacity is calculated by multiplying the number of air source heat pump modules by the single air source heat pump module capacity. In some embodiments, the total capacity is less than 1592.40 MBH. In some embodiments, the total capacity is between 1592.40 MBH and 3472.96 MBH. In some embodiments, the total capacity is greater than 3472.96 MBH.

The approximate load for a supply air handling unit, which distributes conditioned air throughout a building (e.g., work, office, gym, residence, laboratory, data center, or any space that requires conditioned air), to be met by the air source heat pump with exhaust plenum system is calculated using the following equation:

$$(A_S + A_E) \times (K) \times (T_1 - T_2) = L$$

In this equation, $A_S$ represents supply airflow (in CFM), $A_E$ represents building infrastructure exhaust airflow (in CFM), K represents the density-specific heat product factor (unitless), $T_1$ represents the design temperature (in ° F.), $T_2$ represents the ambient airflow (in ° F.), and L represents the load (in MBH).

In some embodiments, the density-specific heat product factor K is between 1.08-1.12 depending on air conditions. The density-specific heat product K is calculated using the following equation:

$$(AIRDEN) \times (CPAIR) \times (CONVFC) = K$$

In an operational example, with the air density (AIRDEN) at 0.0745 lbm/ft^3, the isobaric specific heat of air (CPAIR) at 0.2444 BTU/(lbm*° F.), and Convective Heat Transfer Coefficient (CONVFC) at 60 min/hr, and density-specific heat product (K) equals 1.0925 BTU/(h*cfm*F).

In one embodiment, with 50,000 CFM as the sum of the supply airflow and the building infrastructure exhaust airflow, a density-specific heat product factor of 1.114, a design temperature of 55° F., and an ambient airflow temperature of 0° F., the calculated load of the supply air handling unit is 3,063.5 MBH (3,063,500 BTU/H). The design temperature is the specific outdoor temperature conditions that the ventilation system is designed to handle. There are various design temperatures such as a cooling season design temperature, heating season design temperature, and an indoor design temperature. Of course, there may be other design temperatures for specific applications, such as data centers, enclosed stadiums, and the like.

In some embodiments, at 3,063.5 MBH with an ambient airflow temperature of 0° F., 16 30-ton air source heat pump modules are required to heat the ambient airflow temperature to 70° F. with a standard air source heat pump. In some embodiments, if the building infrastructure exhaust airflow released from the building, typically from 70° F.-72° F., is mixed with 0° F. ambient airflow, the number of air source heat pump modules can be reduced to 14.

For every 25,000 CFM of supply airflow and building infrastructure exhaust airflow removed from the air source heat pump, 1 air source heat pump module can be removed.

Figure 11C:
FIG. 11C illustrates a chart depicting the air source heat pump with exhaust plenum system cooling capacity provided by a number of different ventilation system modules.

FIG. 11C illustrates a chart depicting the air source heat pump with exhaust plenum system cooling capacity in accordance with eleven embodiments. In these examples, the air source heat pump with exhaust plenum system is used in connection to a laboratory setting for a full year.

In chart 1106, column 1 indicates the number of air source heat pump modules (shown in FIG. 6B and FIG. 6C) in the laboratory, ranging from 6 to 16. In some embodiments, the number of air source heat pump modules in a laboratory is less than 6. In some embodiments, the number of air source heat pump modules in a laboratory is greater than 16.

Column 2 indicates the total ambient airflow required by the source/sink fans, measured in CFM. This is calculated by multiplying the required airflow of the air source heat pump with exhaust plenum system (which is 24,000 CFM in each embodiment) by the number of air source heat pump modules in the given embodiment. For example, for an air source heat pump with exhaust plenum system comprising 10 modules, the required total airflow is 240,000 CFM.

Column 3 indicates the laboratory building infrastructure exhaust airflow, measured in CFM. The laboratory building infrastructure exhaust airflow is used in the exhaust plenum system. In some embodiments, laboratory space requires 1.5-2 CFM per square foot of ambient airflow. This requirement is based on the number of air changes per hour as well as the load of the laboratory space.

The CFM of supply airflow and building infrastructure exhaust airflow is calculated using the following equation:

$$(SQ)(A_A) = (A_S + A_E)$$

In this equation, SQ represents the square footage of the building (in ft^2), $A_A$ represents the required amount of ambient airflow (in CFM/ft^2), $A_S$ represents the supply airflow (in CFM), and $A_E$ represents the building infrastructure exhaust airflow (in CFM).

In this embodiment, with the lab building comprising 25,000 square feet and laboratory space requiring 2 CFM per square foot of ambient airflow, the laboratory building requires 50,000 CFM supply airflow and building infrastructure exhaust airflow.

Column 4 indicates the ambient airflow temperature, measured in ° F. In this embodiment, for each number of air source heat pump modules, the ambient airflow temperature is 95° F. This is to ensure standardization and for ease of comparison between the number of air source heat pump modules. In some embodiments, the ambient airflow temperature is lower than 95° F. In some embodiments, the ambient airflow temperature is higher than 95° F.

Column 5 indicates the building infrastructure exhaust airflow temperature, measured in ° F. In this embodiment, for each of the air source heat pump modules, the building infrastructure exhaust airflow temperature is 72° F. This is to ensure standardization and for ease of comparison between the number of air source heat pump modules. In this embodiment, In some embodiments, the building infrastructure exhaust airflow temperature is lower than 72° F. In some embodiments, the building infrastructure exhaust airflow temperature is higher than 72° F.

Column 6 indicates the exhaust-ambient airflow mixture temperature, measured in ° F. In some embodiments, the exhaust-ambient airflow mixture temperature is greater than 92.0° F. In some embodiments, the exhaust-ambient airflow mixture temperature is any number between 92.0° F. and 87.0° F. In some embodiments, the exhaust-ambient airflow mixture temperature is less than 87.0° F.

Column 7 indicates the single air source heat pump module capacity, measured in tons of refrigeration. The single air source heat pump module capacity is calculated by manufacturers and provided to users. In some embodiments, the single air source heat pump module capacity is less than 25.98 tons. In some embodiments, the single air source heat pump module capacity is any number between 26.82 tons and 25.98 tons. In some embodiments, the single air source heat pump module capacity is greater than 26.82 tons.

Column 8 indicates the total capacity, measured in tons of refrigeration. The total capacity is calculated by multiplying the number of air source heat pump modules by the single air source heat pump module capacity. In some embodiments, the total capacity is less than 160.94 tons. In some embodiments, the total capacity is between 160.94 tons and 415.68 tons. In some embodiments, the total capacity is greater than 415.68 tons.

The approximate load of the supply air handling unit to be met by the air source heat pump is calculated using the following equation:

$$(A_S + A_E) \times (HFAC) \times \left(\frac{DB}{WB_1} - \frac{DB}{WB_2}\right) = L$$

In this equation, $A_S$ represents supply airflow (in CFM), $A_E$ represents building infrastructure exhaust airflow (in CFM), HFAC represents the enthalpy factor (unitless), $(DB/WB)_1$ represents a ratio of the dry bulb (DB) temperature to a first wet bulb (WB) temperature, $(DB/WB)_2$ represents a ratio of the DB temperature to a second WB temperature, and L represents the load (in thousands of BTU per hour (MBH)).

The enthalpy factor is calculated using the following equation:

(AIRDEN)×(CONVFC)=HFAC

In one embodiment, with the air density (AIRDEN) at 0.0745 lbm/ft^3, the CPAIR and convective heat transfer coefficient (CONVFC) at 60 min/hr, and the enthalpy factor (HFAC) equals 4.47 (lbm*min)/(h*ft^3). The HFAC helps to determine the total load on a ventilation system.

In an example, to cool ambient airflow from 91 DB/73 WB to 52 DB/51.8 WB, with 50,000 CFM as the sum of supply airflow and building infrastructure exhaust airflow, an enthalpy factor of 4.5, and the air source heat pump cooling the ambient airflow from 36.6 BTU/lb to 21.3 BTU/lb, the load is approximately 287 cooling tons, or 3,442.5 MBH (3,442,500 BTU/H).

With a load of approximately 287 cooling tons, approximately 12 30-ton air source heat pump modules are required to cool the ambient airflow temperature to 72° F. with a standard air source heat pump. In some embodiments, if the air source heat pump receives an exhaust-ambient airflow mixture through the exhaust plenum system, then 11 30-ton air source heat pump modules are required.

Figure 12A:
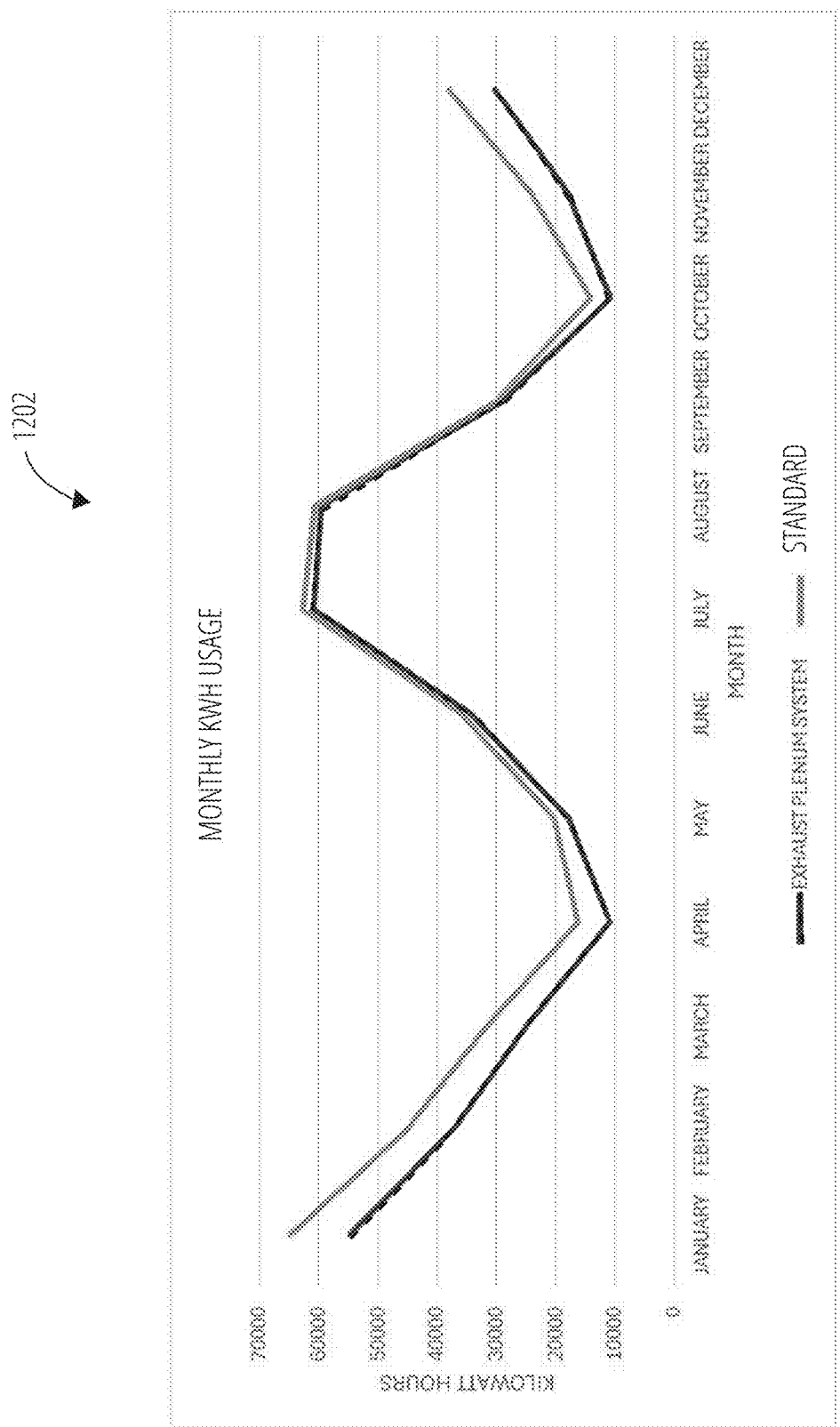
FIG. 12A illustrates a graph displaying the total monthly output of a standard air source heat pump and an exemplary air source heat pump with exhaust plenum system for a 50,000 CFM laboratory example in accordance with the disclosed subject matter.

FIG. 12A illustrates a graph displaying the total monthly output of a standard air source heat pump and an air source heat pump with exhaust plenum system for a 50,000 CFM laboratory in accordance with one embodiment. In the monthly electric usage graph 1202, the standard air source heat pump and the air source heat pump with exhaust plenum system is running for 12 hours per day. The dashed line represents the exhaust plenum system and the solid line represents the standard air source heat pump. As shown in the graph, the exhaust plenum system produces less kWh each month than the standard air source heat pump.

FIG. 12B illustrates a table displaying the heating output, cooling output, and total output of a standard air source heat pump and an air source heat pump with exhaust plenum system for a 50,000 CFM laboratory in accordance with the disclosed subject matter. As shown in the overall electric usage chart 1204, the air source heat pump with exhaust plenum system is 21.19% more efficient than the standard air source heat pump for heating operations. The air source heat pump with exhaust plenum system is 3.86% more efficient than the standard air source heat pump for cooling operations. The air source heat pump with exhaust plenum system is 12.5% more efficient than the standard air source heat pump overall.

FIG. 12C illustrates a table displaying the monthly maximum output (i.e., the kWh for the month) of a standard air source heat pump and an air source heat pump with exhaust plenum system for a 50,000 CFM laboratory in accordance with one embodiment. As shown in electric demand comparison chart 1206, in January, the air source heat pump with exhaust plenum system is 8.1% more efficient than the standard air source heat pump. In February, the air source heat pump with exhaust plenum system is 11.7% more efficient than the standard air source heat pump. In March, the air source heat pump with exhaust plenum system is 14.7% more efficient than the standard air source heat pump. In April, the air source heat pump with exhaust plenum system is 6.7% more efficient than the standard air source heat pump. In May, the air source heat pump with exhaust plenum system is 4.8% more efficient than the standard air source heat pump. In June, the air source heat pump with exhaust plenum system is 2.8% more efficient than the standard air source heat pump. In July, the air source heat pump with exhaust plenum system is 3.6% more efficient than the standard air source heat pump. In August, the air source heat pump with exhaust plenum system is 2.8% more efficient than the standard air source heat pump. In September, the air source heat pump with exhaust plenum system is 3.2% more efficient than the standard air source heat pump. In October, the air source heat pump with exhaust plenum system is 2.5% more efficient than the standard air source heat pump. In November, the air source heat pump with exhaust plenum system is 14.4% more efficient than the standard air source heat pump. In December, the air source heat pump with exhaust plenum system is 14.5% more efficient than the standard air source heat pump.

As seen in the electric demand comparison chart 1206, during the time of year that is a typical heating season, the air source heat pump with exhaust plenum system is even more efficient than when used in the cooling season.

FIG. 12D illustrates a table displaying the number of air source heat pump modules required for a standard air source heat pump and an air source heat pump with exhaust plenum system in relation to FIG. 11B-FIG. 12C. In the example shown in module comparison chart 1208, the standard air source heat pump requires 16 air source heat pump modules, while the air source heat pump with exhaust plenum system only requires 14 air source heat pump modules.

Figure 13A:
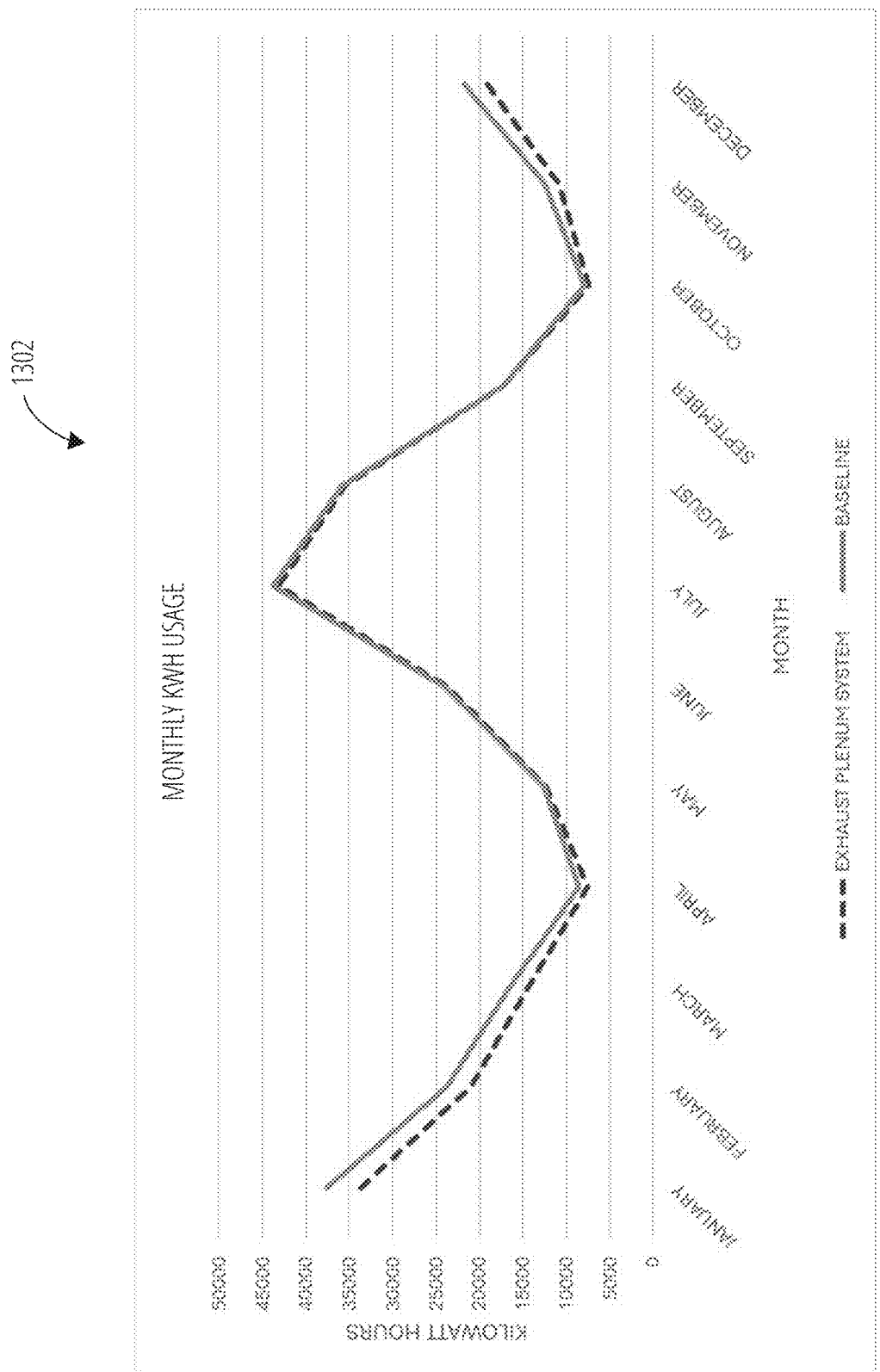
FIG. 13A illustrates a graph displaying the total monthly output of a standard air source heat pump and an air source heat pump with exhaust plenum system for a high rise residential building in accordance with one embodiment.

FIG. 13A illustrates a graph displaying the total monthly output of a standard air source heat pump and an air source heat pump with exhaust plenum system for a high rise residential building in accordance with one embodiment.

In the example shown in graph 1302, an exemplary high-rise residential building comprising 100,000 square feet and 10 floors is generated in an energy-modeling software to determine approximate building loads and airflow requirements. In this embodiment, weather data was based upon the hourly average temperature at Boston Logan Airport.

The minimum ventilation requirement for the building is determined to be 10,000 CFM ambient airflow and to balance the building, 10,000 CFM of building infrastructure exhaust airflow is produced. Additional ventilation and building infrastructure exhaust airflow is required during certain periods of the day, and calculations based on restroom and kitchen spaces bring the maximum ventilation requirement to 17,500 CFM during certain time periods.

The monthly output values represent the kWh needed to heat and cool the building from the monthly average temperature of ambient airflow to 70° F. inside the building.

The dashed line represents the exhaust plenum system and the solid line represents the standard air source heat pump. As shown in the graph, the exhaust plenum system produces less kWh each month than the standard air source heat pump.

FIG. 13B illustrates a table of a standard air source heat pump heating and cooling output for a high rise residential building in accordance with one embodiment.

In monthly baseline table 1304, the monthly output values represent the kWh needed to heat and cool the building from the hourly average temperature of ambient airflow to 70° F. and 72° F., respectively, inside the building.

In some embodiments, the heat kWh output is less than 548.94 kWh. In some embodiments, the heat kWh output is between 548.94 kWh and 37,674.09 kWh. In some embodiments, the heat kWh output is greater than 37,674.09 kWh. In some embodiments, the total heat output for a year is 130,033.43 kWh.

In some embodiments, the cool kWh output is less than 153.24 kWh. In some embodiments, the cool kWh output is between 153.24 kWh and 43,301.17 kWh. In some embodiments, the cool kWh output is greater than 43,301.17 kWh. In some embodiments, the total cool output for a year is 132,606.12 kWh.

FIG. 13C illustrates a table of an air source heat pump with exhaust plenum system heating and cooling output for a high rise residential building of FIG. 13B in accordance with an embodiment of the disclosed subject matter.

In the example shown in monthly table for system with exhaust plenum system 1306, the heat kWh output is less than 537.92 kWh. In some embodiments, the heat kWh output is between 537.92 kWh and 33,511.16 kWh. In some embodiments, the heat kWh output is greater than 33,511.16 kWh. In some embodiments, the total heat output for a year is 114,086.22 kWh.

In some embodiments, the cool kWh output is less than 157.15 kWh. In some embodiments, the cool kWh output is between 157.15 kWh and 34,659.84 kWh. In some embodiments, the cool kWh output is greater than 34,659.84 kWh. In some embodiments, the total cool output for a year is 131,181.81 kWh.

In comparison to the monthly baseline table 1304 of FIG. 13B, which illustrates a table of the standard air source heat pump heating and cooling output in kWh for the same exemplary high rise residential building, the air source heat pump with exhaust plenum system utilizes 11.05% less energy to produce heat than the standard air source heat pump in January in some embodiments. In some embodiments, in February, the air source heat pump with exhaust plenum system utilizes 12.32% less energy to produce heat than the standard air source heat pump. In some embodiments, in March, the air source heat pump with exhaust plenum system utilizes 14.33% less energy to produce heat than the standard air source heat pump. In some embodiments, in April, the air source heat pump with exhaust plenum system utilizes 15.61% less energy to produce heat than the standard air source heat pump. In some embodiments, in May, the air source heat pump with exhaust plenum system utilizes 10.15% less energy to produce heat than the standard air source heat pump. In some embodiments, in June, the air source heat pump with exhaust plenum system utilizes 6.77% less energy to produce heat than the standard air source heat pump. In some embodiments, in July, the air source heat pump with exhaust plenum system utilizes 2.01% less energy to produce heat than the standard air source heat pump. In some embodiments, in August, the air source heat pump with exhaust plenum system utilizes 2.56% less energy to produce heat than the standard air source heat pump. In some embodiments, in September, the air source heat pump with exhaust plenum system utilizes 5.51% less energy to produce heat than the standard air source heat pump. In some embodiments, in October, the air source heat pump with exhaust plenum system utilizes 13.41% less energy to produce heat than the standard air source heat pump. In some embodiments, in November, the air source heat pump with exhaust plenum system utilizes 13.50% less energy to produce heat than the standard air source heat pump. In some embodiments, in December, the air source heat pump with exhaust plenum system utilizes 12.83% less energy to produce heat than the standard air source heat pump.

In some embodiments, in March, the air source heat pump with exhaust plenum system utilizes 0.51% less energy to produce cooling than the standard air source heat pump. In some embodiments, in April, the air source heat pump with exhaust plenum system utilizes 3.43% less energy to produce cooling than the standard air source heat pump. In some embodiments, in May, the air source heat pump with exhaust plenum system utilizes 0.31% less energy to produce cooling than the standard air source heat pump. In some embodiments, in June, the air source heat pump with exhaust plenum system utilizes 1.17% less energy to produce cooling than the standard air source heat pump. In some embodiments, in July, the air source heat pump with exhaust plenum system utilizes 1.65% less energy to produce cooling than the standard air source heat pump. In some embodiments, in August, the air source heat pump with exhaust plenum system utilizes 1.01% less energy to produce cooling than the standard air source heat pump. In some embodiments, in September, the air source heat pump with exhaust plenum system utilizes 0.00012% less energy to produce cooling than the standard air source heat pump. In some embodiments, in October, the air source heat pump with exhaust plenum system utilizes 0.00094% less energy to produce cooling than the standard air source heat pump. In some embodiments, in November, the air source heat pump with exhaust plenum system utilizes 2.55% less energy to produce cooling than the standard air source heat pump.

In some embodiments, in January, the air source heat pump with exhaust plenum system utilizes 11.05% less total energy than the standard air source heat pump in January. In some embodiments, in February, the air source heat pump with exhaust plenum system utilizes 12.32% less total energy than the standard air source heat pump. In some embodiments, in March, the air source heat pump with exhaust plenum system produces a total of 14,324.96 kWh and the standard air source heat pump produces a total of 16,562.84, therefore the air source heat pump with exhaust plenum system utilizes 13.51% less total energy than the standard air source heat pump. In some embodiments, in April, the air source heat pump with exhaust plenum system produces a total of 7,515.44 kWh and the standard air source heat pump produces a total of 8610.08 kWh, therefore the air source heat pump with exhaust plenum system utilizes 12.71% less total energy than the standard air source heat pump. In some embodiments, in May, the air source heat pump with exhaust plenum system produces a total of 12,303.30 kWh and the standard air source heat pump produces a total of 12,633.72 kWh, therefore the air source heat pump with exhaust plenum system utilizes 2.62% less total energy than the standard air source heat pump. In some embodiments, in June, the air source heat pump with exhaust plenum system produces a total of 23,677.21 kWh and the standard air source heat pump produces a total of 24,045.04 kWh, therefore the air source heat pump with exhaust plenum system utilizes 1.53% less total energy than the standard air source heat pump. In some embodiments, in July, the air source heat pump with exhaust plenum system produces a total of 43,123.08 kWh and the standard air source heat pump produces a total of 43,850.11 kWh, therefore the air source heat pump with exhaust plenum system utilizes 1.66% less total energy than the standard air source heat pump. In some embodiments, in August, the air source heat pump with exhaust plenum system produces a total of 35,558.64 kWh and the standard air source heat pump produces a total of 35,936.70 kWh, therefore the air source heat pump with exhaust plenum system utilizes 1.05% less total energy than the standard air source heat pump. In some embodiments, in September, the air source heat pump with exhaust plenum system produces a total of 17,207.41 kWh and the standard air source heat pump produces a total of 17,316.03 kWh, therefore the air source heat pump with exhaust plenum system utilizes 0.63% less total energy than the standard air source heat pump. In some embodiments, in October, the air source heat pump with exhaust plenum system produces a total of 7,394.37 kWh and the standard air source heat pump produces a total of 7,976.12 kWh, therefore the air source heat pump with exhaust plenum system utilizes 7.29% less total energy than the standard air source heat pump. In some embodiments, in November, the air source heat pump with exhaust plenum system produces a total of 10,776.35 kWh and the standard air source heat pump produces a total of 12,429.72 kWh, therefore the air source heat pump with exhaust plenum system utilizes 13.30% less total energy than the standard air source heat pump. In some embodiments, in December, the air source heat pump with exhaust plenum system utilizes 12.83% less energy to produce heat than the standard air source heat pump.

FIG. 13D illustrates a table comparing the heat and cool output of a standard air source heat pump and an air source heat pump with exhaust plenum system, as well as the efficiency improvement between them, in accordance with one embodiment.

In some embodiments, as shown, the total heat output for the standard air source heat pump is 130,033 kWh and the total heat output for the exhaust plenum system is 114,086 kWh, therefore the air source heat pump with exhaust plenum system is 12.26% more efficient than the standard air source heat pump in this scenario.

In some embodiments, as shown, the total cooling output for the standard air source heat pump is 132,606 kWh and the total cooling output for the air source heat pump with exhaust plenum system is 131,182 kWh, therefore the air source heat pump with exhaust plenum system is 1.07% more efficient than the standard air source heat pump in this scenario.

In some embodiments, as shown, the total output for the standard air source heat pump is 262,639 kWh and the total output for the air source heat pump with exhaust plenum system is 245,268 kWh, therefore the air source heat pump with exhaust plenum system is 6.61% more efficient than the standard air source heat pump in this scenario.

Figure 14:
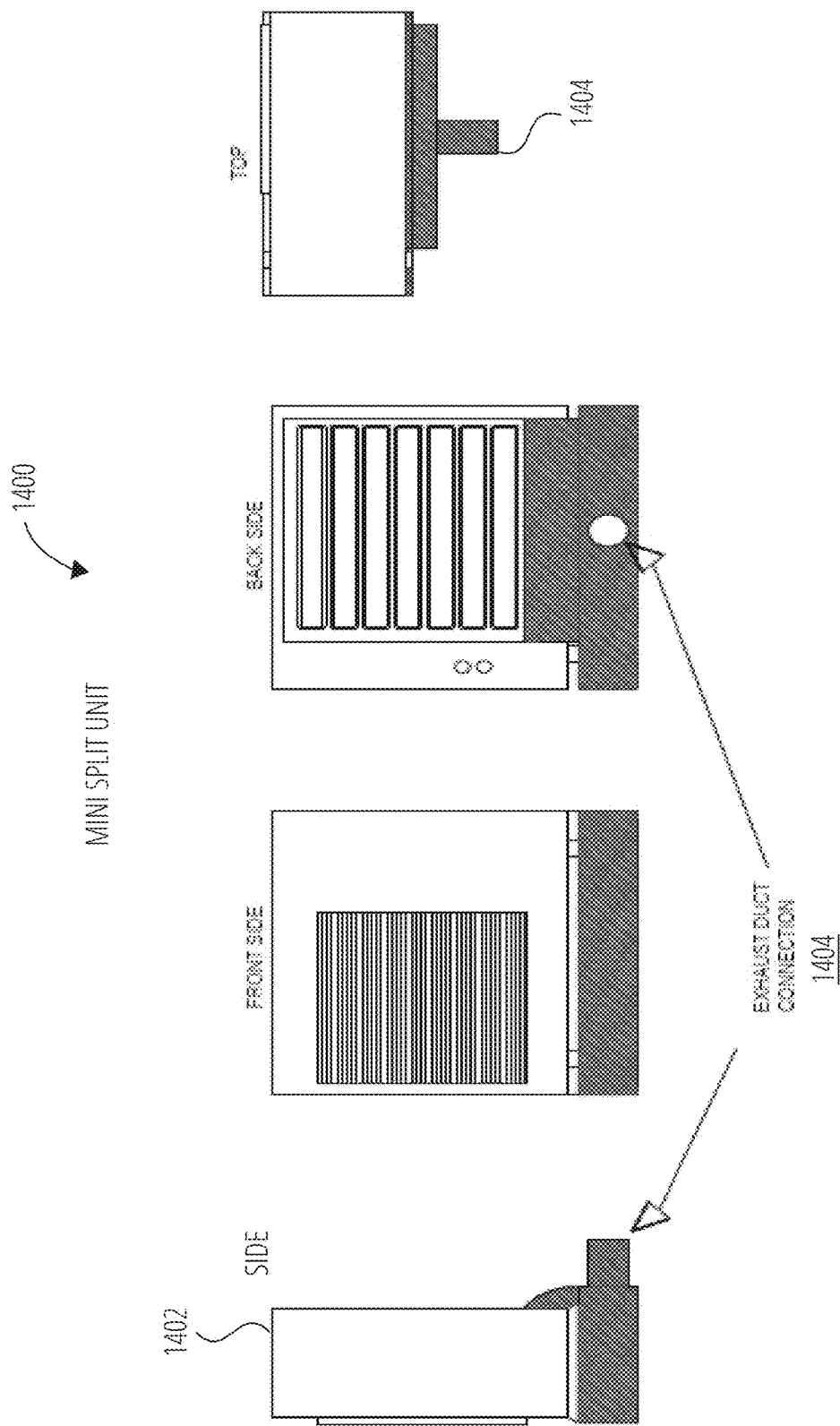
FIG. 14 illustrates an example of a mini-split air source heat pump condensing unit with an exhaust plenum system in accordance with an embodiment of the disclosed subject matter.
Figure 15:
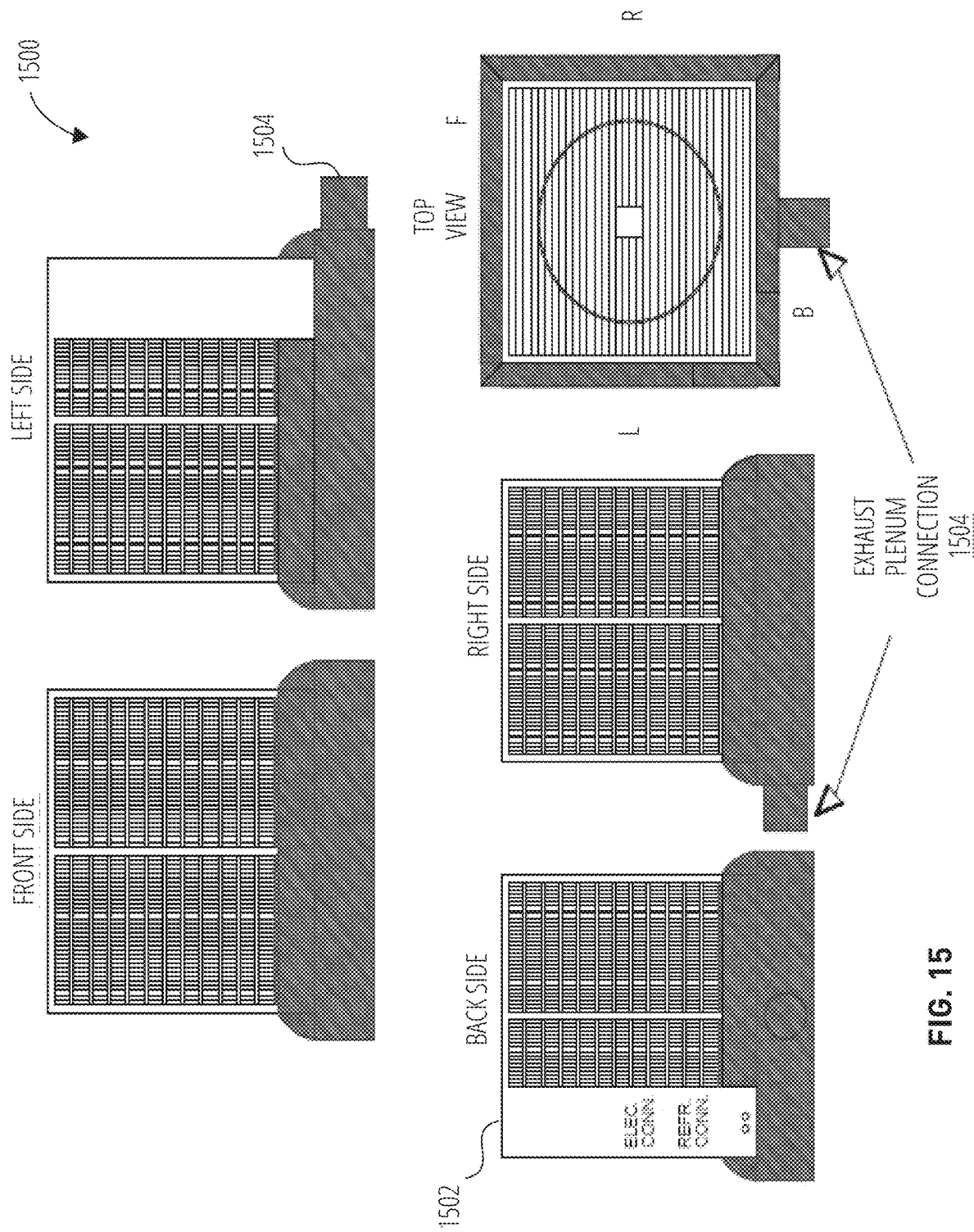
FIG. 15 illustrates an example of a residential style air source heat pump condensing unit with an exhaust plenum system in accordance with an embodiment of the disclosed subject matter.
Figure 16:
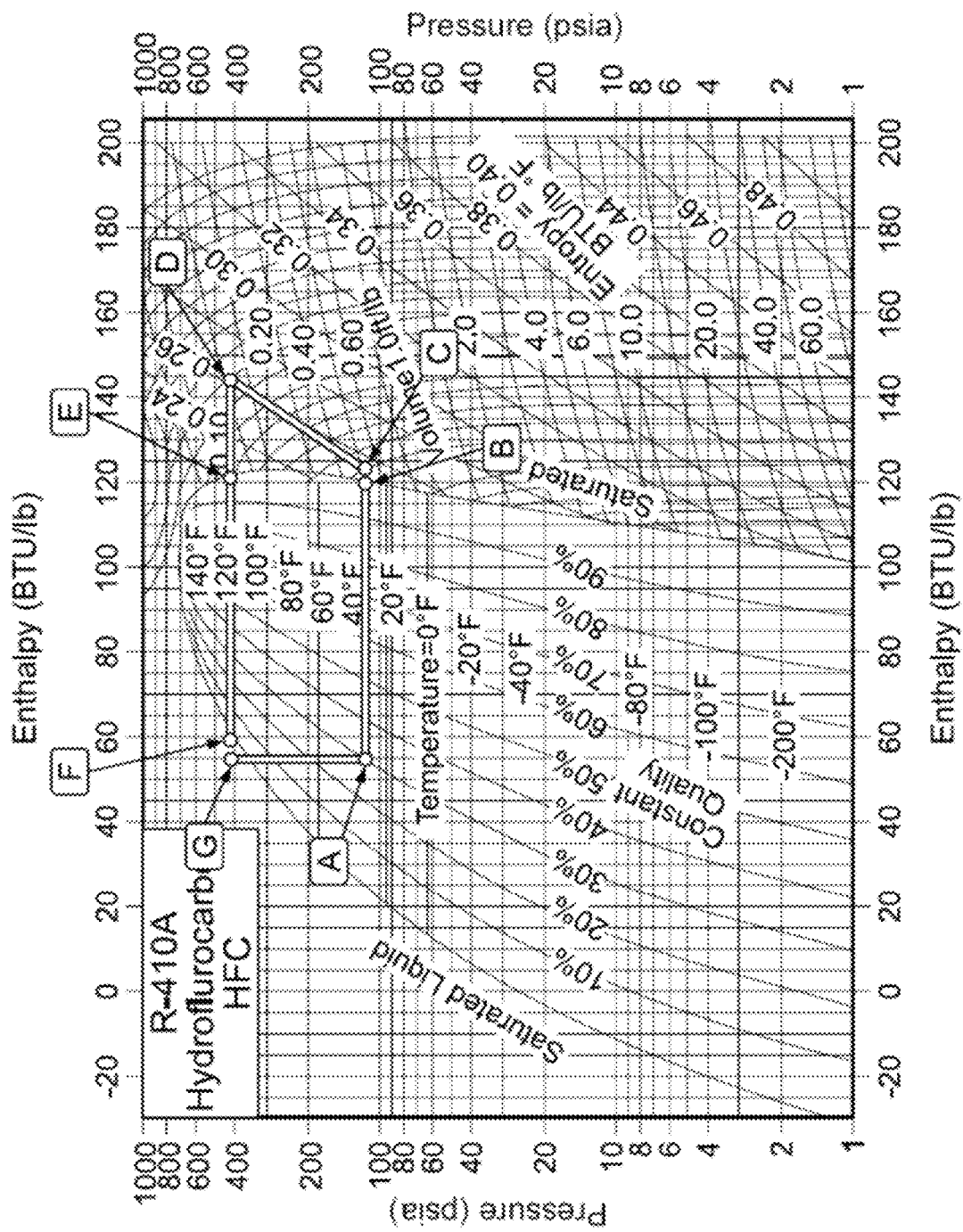
FIG. 16 illustrates an example of a pressure-enthalpy refrigeration cycle of a conventional thermodynamic cooling system at 95° F. ambient airflow temperature.

FIG. 14 illustrates an example of a mini-split air source heat pump condensing unit with an exhaust plenum system, while FIG. 15 illustrates an example of a residential style air source heat pump condensing unit with an exhaust plenum system in accordance with an embodiment of the disclosed subject matter.

The mini split unit with exhaust plenum system 1400 includes a condensing unit 1402 and an exhaust duct connection 1404, and the residential unit with exhaust plenum system 1500 comprises an exhaust plenum connection 1504 and a condensing unit 1502.

The disclosed exhaust plenum system can be applied to single-family homes or dwellings. Specifically newer residential homes are often built with a focus on energy efficiency, which includes making the homes more airtight to prevent heat loss and reduce energy consumption. However, the tighter home construction can also lead to a lack of natural ventilation, potentially causing indoor air quality issues such as stale air and increased levels of pollutants.

To address this, modern building codes and practices often include requirements for mechanical ventilation systems. These systems require fresh outdoor air be introduced to the home and the removal of exhaust air to balance the home and remove pollutants/moisture from kitchens and bathrooms.

The exhaust air being removed from the home can be directed to the exhaust plenum system via the exhaust duct connection 1404 in the mini-split air source heat pump condensing unit implementation or the exhaust duct connection 1504 in the residential style air source heat pump implementation to increase the efficiency of the residential condensing unit and/or mini-split style unit using the techniques described herein.

Although the example routines described above depict a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

What is claimed is:

1. A ventilation system having an exhaust plenum system for improved heating and cooling of a building, comprising:
   an air source heat pump (ASHP), wherein the ASHP comprises:
      an ASHP coil, and
      a source/sink fan; and
   the exhaust plenum system, comprising an exhaust plenum system open grating and an exhaust plenum,
      wherein the exhaust plenum is configured to collect a building infrastructure exhaust airflow including air and/or waste heat from industrial processes from a plurality of sources within the building and direct the building infrastructure exhaust airflow to the exhaust plenum system open grating,
      the directed building infrastructure exhaust airflow exits the exhaust plenum system open grating into an outdoor environment and combines with ambient airflow outside of the exhaust plenum system to create an exhaust-ambient airflow mixture,
      the source/sink fan is operable to direct the exhaust-ambient airflow mixture to pass around the ASHP coil, and
      the ASHP coil is operable to extract an additional amount of energy from the exhaust-ambient airflow mixture as compared to an amount of energy extracted from an ambient airflow mixture alone.

2. The ventilation system of claim 1, wherein the exhaust plenum system is comprised of a durable material.

3. The ventilation system of claim 1, wherein the exhaust plenum system comprises heating coils that are configured to inject heat into the building infrastructure exhaust airflow.

4. The ventilation system of claim 3, wherein the heating coils utilize hot water, steam, or electricity to produce heat.

5. A method for improved heating and cooling of a building using an exhaust plenum system with a ventilation system, comprising:
   directing a building infrastructure exhaust airflow including air and/or waste heat from industrial processes from a plurality of sources within the building into an exhaust plenum and toward an air source heat pump (ASHP),
   wherein the exhaust plenum system includes an exhaust plenum system open grating that enables the building infrastructure exhaust airflow to exit the exhaust plenum into an outdoor environment, and the exhaust plenum system open grating is positioned adjacent to the ASHP;
   mixing the building infrastructure exhaust airflow with ambient airflow in the outdoor environment outside of the exhaust plenum system to create an exhaust-ambient airflow mixture;
   passing the exhaust-ambient airflow mixture around an ASHP coil of the ASHP; and
   extracting, via the ASHP coil, an additional amount of energy from the exhaust-ambient airflow mixture as compared to an amount of energy extracted from an ambient airflow mixture alone.

6. The method of claim 5, further comprising:
   exiting the exhaust-ambient airflow mixture out through a top of a source/sink fan.

7. The method of claim 5, further comprising:
   injecting heat into the building infrastructure exhaust airflow using heating coils.

8. The method of claim 7, wherein the heating coils utilize hot water, steam, or electricity to produce the heat.

9. A ventilation system for a building, comprising:
   an air source heat pump including a compressor, a condenser, a reversing valve, and an evaporator; and
   an exhaust plenum system configured to:
      collect building infrastructure exhaust airflow including air and/or waste heat from industrial processes from a plurality of sources within the building,
      direct the building infrastructure exhaust airflow through an exhaust plenum system open grating, and
      mix the building infrastructure exhaust airflow with an ambient airflow in an outdoor environment outside of the exhaust plenum system to provide an exhaust-ambient airflow mixture to either the evaporator or the condenser of the air source heat pump, wherein the exhaust-ambient airflow mixture provides an additional amount of energy to be extracted by the evaporator or the condenser from the exhaust-ambient airflow mixture as compared to an amount of energy extracted from an ambient airflow mixture alone to improve efficiency of the air source heat pump.

10. The ventilation system of claim 9, further comprising:
    ductwork coupled at a first end of a building infrastructure system that produces building infrastructure exhaust airflow and coupled at a second end to the exhaust plenum system.

11. The ventilation system of claim 9, wherein the exhaust plenum system includes galvanized steel or aluminum.

12. The ventilation system of claim 9, wherein the building infrastructure exhaust airflow includes air passed over steam piping systems, electrical panels, appliances, rooms with windows, or vehicle parking structures.

13. The ventilation system of claim 9, wherein the exhaust plenum system comprises:
    an exhaust plenum system open grating to allow ambient airflow to mix with the building infrastructure exhaust airflow to provide the exhaust-ambient airflow mixture.

14. The ventilation system of claim 9, wherein the exhaust plenum system comprises:
    multiple duct connections, wherein one or more of the multiple duct connections are equipped with dampers or louvers operable to regulate the building infrastructure exhaust airflow and prevent backflow of the building infrastructure exhaust airflow when the ventilation system is not in operation.

15. A method for ventilating a building, comprising:
    entering airflow into an air source heat pump via source/sink fans;
    passing the airflow over an evaporator or a condenser with the source/sink fans;
    gathering energy from the airflow evaporating or condensing;
    converting the airflow into a building infrastructure exhaust airflow, including air and/or waste heat from industrial processes from a plurality of sources within the building;
    rejecting the building infrastructure exhaust airflow from the evaporator or the condenser;

collecting the building infrastructure exhaust airflow into an exhaust plenum of an exhaust plenum system;

passing the building infrastructure exhaust airflow through the exhaust plenum;

exiting the building infrastructure exhaust airflow from the exhaust plenum via an exhaust plenum system open grating of the exhaust plenum system;

rejecting the building infrastructure exhaust airflow from the building;

mixing the building infrastructure exhaust airflow with ambient airflow in an outdoor environment outside of the exhaust plenum system, thereby creating an exhaust-ambient airflow mixture; and directing the exhaust-ambient airflow mixture over the evaporator or the condenser to restart the cycle of converting the airflow from the evaporating or condensing into building infrastructure exhaust airflow.

16. The method of claim 15, wherein the exhaust-ambient airflow mixture provides an additional amount of energy for extraction by the evaporator or the condenser from the exhaust-ambient airflow mixture as compared to an amount of energy extracted from an ambient airflow mixture alone to improve efficiency of the air source heat pump.

17. The method of claim 15, wherein the exhaust-ambient airflow mixture is recycled by the air source heat pump once.

18. The ventilation system of claim 1, wherein the waste heat is heat from a boiler, a data center server, computer equipment, an air compressor, a steam system, a dryer exhaust, an oven, a stove, cooking equipment, an appliance, a generator, or a turbine.

19. The ventilation system of claim 9, wherein the exhaust plenum system comprises the exhaust plenum system open grating formed from a walkway adjacent to the air source heat pump.

* * * * *